(12) United States Patent
Li et al.

(10) Patent No.: US 11,363,365 B2
(45) Date of Patent: Jun. 14, 2022

(54) LOUDSPEAKER APPARATUS

(71) Applicant: SHENZHEN SHOKZ CO., LTD., Guangdong (CN)

(72) Inventors: Yongjian Li, Shenzhen (CN); Haofeng Zhang, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/098,343

(22) Filed: Nov. 14, 2020

(65) Prior Publication Data

US 2021/0067862 A1 Mar. 4, 2021

Related U.S. Application Data

(63) Continuation of application No. PCT/CN2019/102405, filed on Aug. 24, 2019.

(30) Foreign Application Priority Data

Jan. 5, 2019 (CN) .......................... 201910009907.7

(51) Int. Cl.
*H04R 1/10* (2006.01)
*H04R 1/06* (2006.01)
(Continued)

(52) U.S. Cl.
CPC .......... *H04R 1/1075* (2013.01); *H04R 1/023* (2013.01); *H04R 1/06* (2013.01); *H04R 1/1016* (2013.01);
(Continued)

(58) Field of Classification Search
CPC combination set(s) only.
See application file for complete search history.

(56) References Cited

U.S. PATENT DOCUMENTS 11,159,877 B2 * 10/2021 Li ........................ H04R 1/1066
11,178,477 B2 * 11/2021 Zhang ................... H04R 1/105
(Continued)

FOREIGN PATENT DOCUMENTS

CN 202488645 U 10/2012
CN 105101020 A 11/2015
(Continued)

OTHER PUBLICATIONS

International Search Report in PCT/CN2019/102405 dated Nov. 22, 2019, 8 pages.
(Continued)

*Primary Examiner* — Angelica M McKinney
(74) *Attorney, Agent, or Firm* — Metis IP LLC

(57) ABSTRACT

The present disclosure discloses a loudspeaker apparatus. The loudspeaker apparatus may include a circuit housing, an ear hook, a rear hook, a loudspeaker component, and a magnetic connector. The circuit housing may be configured to accommodate a control circuit or a battery component. The ear hook may be connected to one end of the circuit housing and at least partially covered by a first protective housing. The rear hook connected to another end of the circuit housing and at least partially covered by a second protective housing. The magnetic connector may be configured to absorb a charging interface of an external power source to establish an electrical connection so as to charge the loudspeaker apparatus.

19 Claims, 11 Drawing Sheets

(51) Int. Cl.
*H04R 9/06* (2006.01)
*H04R 5/033* (2006.01)
*H04R 1/02* (2006.01)
*H04R 9/02* (2006.01)

(52) U.S. Cl.
CPC ......... *H04R 1/1025* (2013.01); *H04R 1/1041* (2013.01); *H04R 1/1066* (2013.01); *H04R 5/0335* (2013.01); *H04R 9/025* (2013.01); *H04R 9/06* (2013.01); *H04R 2420/07* (2013.01)

(56) References Cited

U.S. PATENT DOCUMENTS

| | | | |
|---|---|---|---|
| 2016/0192051 A1* | 6/2016 | DiPiazza | H04M 1/05 381/375 |
| 2018/0098153 A1 | 4/2018 | Jan | |
| 2019/0282197 A1* | 9/2019 | Matsumoto | A61B 7/04 |
| 2020/0336824 A1 | 10/2020 | Zheng et al. | |

FOREIGN PATENT DOCUMENTS

| | | | | |
|---|---|---|---|---|
| CN | 105472511 | A | | 4/2016 |
| CN | 205282582 | U | | 6/2016 |
| CN | 106604174 | A | | 4/2017 |
| CN | 206380059 | U | * | 8/2017 |
| CN | 206380059 | U | | 8/2017 |
| CN | 107484054 | A | * | 12/2017 |
| CN | 207010974 | U | | 2/2018 |
| CN | 207039848 | U | | 2/2018 |
| CN | 207070281 | U | | 3/2018 |
| CN | 107948883 | A | | 4/2018 |
| CN | 108091794 | A | | 5/2018 |
| CN | 108873374 | A | | 11/2018 |
| CN | 208258051 | U | | 12/2018 |
| CN | 208299971 | U | | 12/2018 |
| CN | 109547906 | A | | 3/2019 |
| CN | 209184767 | U | | 7/2019 |
| JP | 2018157259 | A | | 10/2018 |
| KR | 101934229 | B1 | | 12/2018 |

OTHER PUBLICATIONS

International Search Report in PCT/CN2019/102403 dated Nov. 21, 2019, 7 pages.
International Search Report in PCT/CN2019/102404 dated Nov. 21, 2019, 8 pages.

* cited by examiner

11,363,365 B2

LOUDSPEAKER APPARATUS

CROSS-REFERENCE TO RELATED APPLICATIONS

This application is a continuation of International Application No. PCT/CN2019/102405 filed on Aug. 24, 2019, which claims priority to Chinese Patent Application No. 201910009907.7 filed on Jan. 5, 2019, the contents of each of which are incorporated herein by reference.

TECHNICAL FIELD

The present disclosure relates to the loudspeaker apparatus field, and more particularly, relates to a sleeve-type design of a loudspeaker apparatus.

BACKGROUND

At present, a loudspeaker apparatus (e.g., headphones, MP3 players, etc.) has become an important item and been widely used (e.g., for playing music, answering calls, etc.) in daily lives. Therefore, a loudspeaker apparatus with improved quality (e.g., a sound quality) is one of the developing direction of the loudspeaker apparatus. During a molding stage of the loudspeaker apparatus, a circuit housing for accommodating a control circuit or a battery may be integrated with a protective sleeve disposed on the periphery of the circuit housing. However, if the circuit housing is integrated with the protective sleeve, a high-temperature environment may cause damage to the control circuit or the battery disposed in the circuit housing, which may affect the quality of the loudspeaker apparatus.

SUMMARY

An embodiment of the present specification provides a loudspeaker apparatus. The loudspeaker apparatus may include: a circuit housing configured to accommodate a control circuit or a battery component; an ear hook connected to one end of the circuit housing and at least partially covered by a first protective housing; a rear hook connected to another end of the circuit housing and at least partially covered by a second protective housing. The first protective housing and the second protective housing may at least partially cover a periphery of the circuit housing from both ends of the circuit housing in a sleeve manner, respectively; a loudspeaker component connected to one end of the ear hook. The loudspeaker component may include an earphone core and an earphone core housing for accommodating the earphone core; and a magnetic connector disposed on the circuit housing. The magnetic connector may be configured to absorb a charging interface of an external power source to establish an electrical connection so as to charge the loudspeaker apparatus. The loudspeaker apparatus of the present disclosure may protect control circuits or batteries from damages caused by high temperatures.

BRIEF DESCRIPTION OF THE DRAWINGS

The present disclosure is further described in terms of exemplary embodiments. These exemplary embodiments are described in detail with reference to the drawings. These embodiments are non-limiting examples, in these embodiments, the same number indicates the same structure, and wherein.

DETAILED DESCRIPTION

Figure 1:
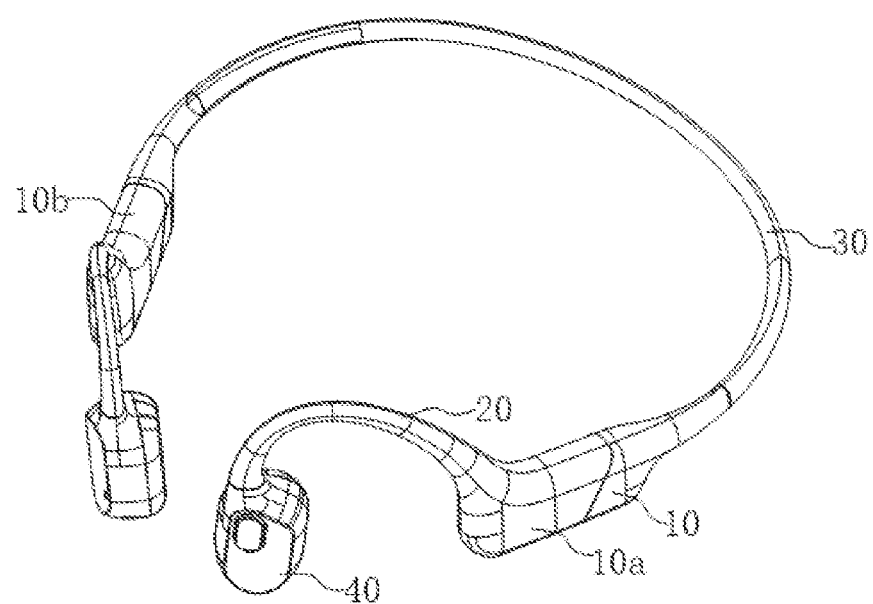
FIG. 1 is a schematic diagram illustrating an exemplary loudspeaker apparatus according to some embodiments of the present disclosure.

In order to illustrate the technical solutions related to the embodiments of the present disclosure, a brief introduction of the drawings referred in the description of the embodiments is provided below. Obviously, drawings described below are only some examples or embodiments of the present disclosure. Those skilled in the art may apply the present disclosure to other similar scenarios according to these drawings without further creative efforts. It should be understood that these embodiments are only provided for those skilled in the art to practice the application, but not intended to limit the scope of the present disclosure. The same numeral in the drawings refers to the same structure or operation, unless it can be obviously obtained from the context or the context illustrates otherwise.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on". The term "one embodiment" means "at least one embodiment"; the term "another embodiment" means "at least one other embodiment". Related definitions of other terms will be given in the description below. In the following, without loss of generality, in describing the present disclosure regarding conduction-related technologies, the description of the "loudspeaker apparatus" or "loudspeaker" will be used. This description is only a form of conduction application. For those skilled in the art, the "loudspeaker apparatus" or "loudspeaker" may also be replaced by other similar words, such as "sound generation apparatus", "hearing aid device" or "speaker". In fact, the various implementations in the present disclosure may be easily applied to other acoustic devices. For example, for those skilled in the art, after understanding the basic principles of loudspeaker apparatus, it is possible to make various modifications and alterations to the structure of and/or methods relating to the loudspeaker apparatus without departing from this principle. Merely by way of example, an ambient sound acquisition and processing function may be added to the loudspeaker apparatus, so that the loudspeaker apparatus may realize the function of a hearing aid. For example, a microphone may detect an ambient sound of the user/wearer, process the ambient sound according to a certain algorithm, and transmit the processed ambient sound (or a generated electrical signal representing the processed ambient sound) to a loudspeaker component. That is, the loudspeaker apparatus may be modified to include the function of detecting an ambient sound, a sound may be transmitted to the user/wearer through the loudspeaker component after certain signal processing, thereby realizing the functions of the hearing aid and the loudspeaker apparatus simultaneously. For example, the algorithm mentioned herein may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

Figure 2:
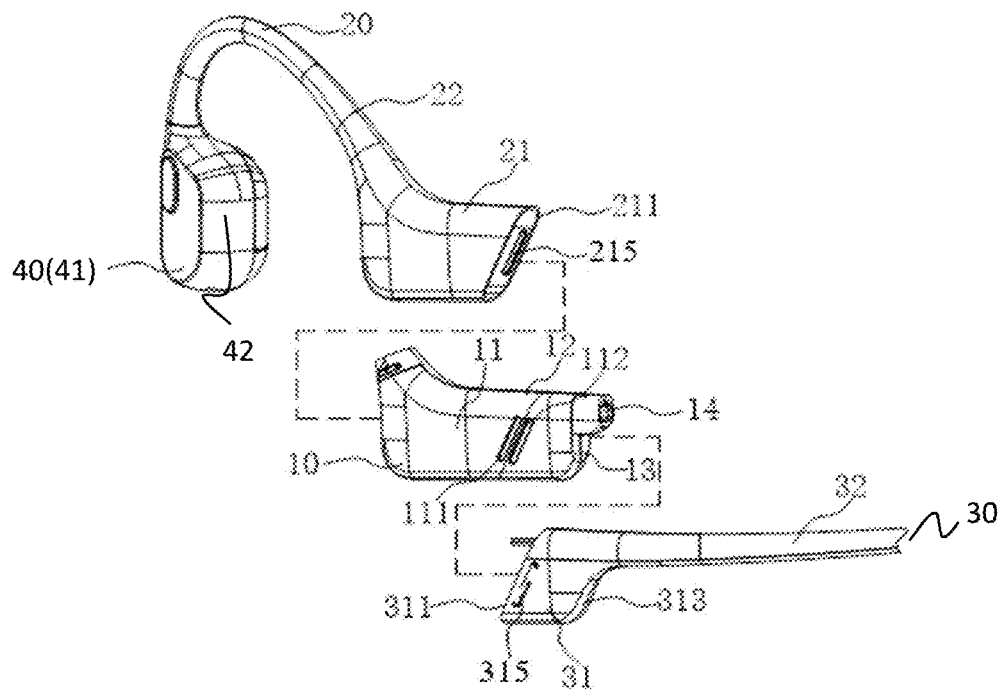
FIG. 2 is a schematic diagram illustrating an exploded view of a portion of the loudspeaker apparatus illustrated in FIG. 1 according to some embodiments of the present disclosure.
Figure 3:
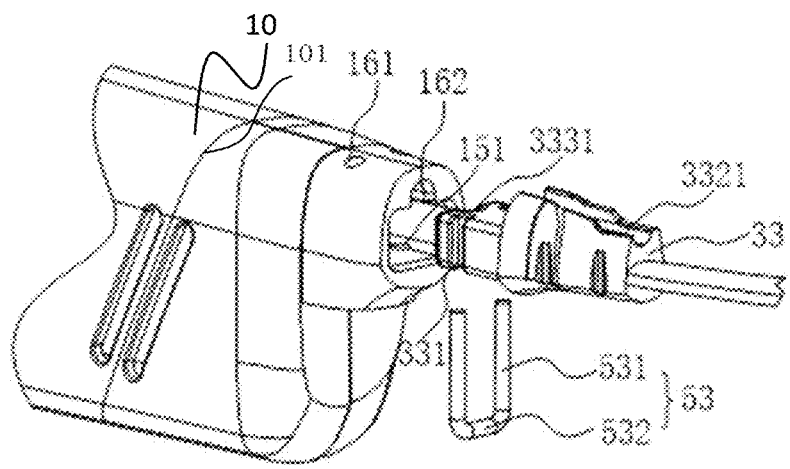
FIG. 3 is a schematic diagram illustrating an exploded view of a portion of the loudspeaker apparatus illustrated in FIG. 1 according to some embodiments of the present disclosure.
Figure 4:
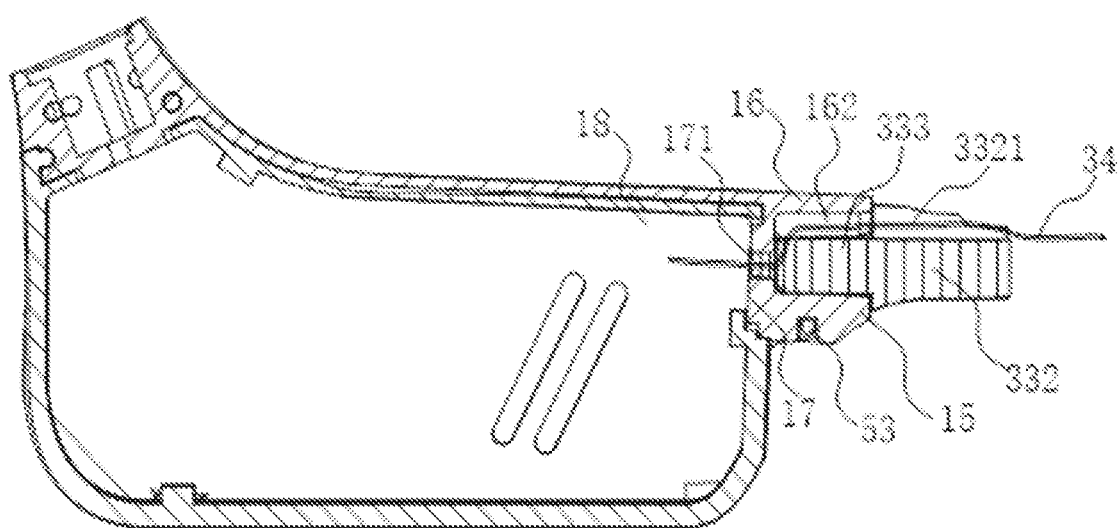
FIG. 4 is a schematic diagram illustrating a cross-sectional view of a portion of the loudspeaker apparatus illustrated in FIG. 1 according to some embodiments of the present disclosure.

FIG. 1 is a schematic diagram illustrating an exemplary loudspeaker apparatus according to some embodiments of the present disclosure. FIG. 2 is a schematic diagram illustrating an exploded view of a portion of the loudspeaker apparatus illustrated in FIG. 1 according to some embodiments of the present disclosure. FIG. 3 is a schematic diagram illustrating an exploded view of a portion of the loudspeaker apparatus illustrated in FIG. 1 according to some embodiments of the present disclosure. FIG. 4 is a schematic diagram illustrating a cross-sectional view of a portion of the loudspeaker apparatus illustrated in FIG. 1 according to some embodiments of the present disclosure.

As shown in FIGS. 1-4, in some embodiments, the loudspeaker apparatus may be an apparatus, such as headphones, an MP3, or another apparatus with a speaker function. Specifically, the loudspeaker apparatus may include circuit housing(s) 10, ear hook(s) 20, a rear hook 30, loudspeaker component(s) 40, control circuit(s) 51, one or more batteries 52, etc. A circuit housing 10 may be configured to accommodate a control circuit 51 and/or a battery 52. A loudspeaker component 40 may include an earphone core housing 41. The earphone core housing 41 may be connected to an ear hook 20 and configured to accommodate an earphone core 42. In some embodiments, the count of the circuit housing(s) 10 and the count of the ear hook(s) 20 may be two, which may correspond to a left side and a right side of a user, respectively. For a certain ear hook 20, an earphone core housing 41 and a circuit housing 10 may be disposed at both sides of the certain ear hook 20, respectively. The rear hook 30 may be further disposed at a side of the circuit housing 10 away from the certain ear hook 20.

As shown in FIG. 2, a first protective housing 21 may be injection-molded on an ear hook 20. Specifically, the ear hook 20 may include a first elastic wire for supporting the shape of the ear hook 20. An ear hook protective sleeve 22 may be injection-molded outside a periphery of the first elastic wire. The ear hook protective sleeve 22 may further form a first protective housing 21 integrated with the ear hook protective sleeve 22 at a connected portion between the ear hook 20 and a circuit housing 10. That is, the first protective housing 21 may be placed on a side of the ear hook protective sleeve 22 facing the circuit housing 10.

Similarly, the rear hook 30 may be injection-molded with a second protective housing 31. Specifically, the rear hook 30 may also include a second elastic wire for supporting the shape of the rear hook 30, and a rear hook protective sleeve 32 injection-molded outside a periphery of the second elastic wire. The rear hook protective sleeve 32 may form a second protective housing 31 integrated with the rear hook protective sleeve 32 at a connected portion between the rear hook 30 and the circuit housing 10. That is, the second protective housing 31 may be placed on a side of the rear hook protective sleeve 32 facing the circuit housing 10.

In some embodiments, the first protective housing 21, the ear hook protective sleeve 22, the second protective housing 31, and the rear hook protective sleeve 32 may include a soft material with a certain elasticity, such as soft silicone, rubber, etc., so as to provide users with a better touch.

In some embodiments, the circuit housing 10, the first protective housing 21, and the second protective housing 31 may be molded separately. The shape of an inner side wall of the first protective housing 21 may match the shape of at least part of an outer side wall of the circuit housing 10 near the ear hook 20. The shape of an inner side wall of the second protective housing 31 may match the shape of at least part of an outer side wall of the circuit housing 10 near the rear hook 30. Furthermore, after the circuit housing 10, the first protective housing 21, and the second protective housing 31 are molded separately, the first protective housing 21 may be placed outside a periphery of the circuit housing 10 near the ear hook 20 from a side of the circuit housing 10 facing the ear hook 20 in a sleeve manner, and the second protective housing 31 may be placed outside a periphery of the circuit housing 10 near the rear hook 30 from a side of the circuit housing 10 facing the rear hook 30 in a sleeve manner, such that the circuit housing 10 may be covered by the first protective housing 21 and the second protective housing 31.

It should be noted that the high environment temperature during the molding of the first protective housing 21 and the second protective housing 31 may cause certain damages to the control circuit 51 or the battery 52 accommodated in the circuit housing 10. By molding the circuit housing 10, the first protective housing 21, and the second protective housing 31 separately, and then assembling them together instead mounting the first protective housing 21 and the second protective housing 31 on the periphery of the circuit housing 10 directly by injection molding, the damage caused by the high temperature to the control circuit 51 or the battery 52 during the molding may be avoided, thereby reducing negative effects on the control circuit 51 or the battery 52 in the molding.

In some embodiments, the circuit housing 10 may include main side wall(s) 11, auxiliary side wall(s) 12, and end wall(s) 13 connected to each other. For example, the circuit housing 10 may be a flat housing. The flat circuit housing 10 may include two opposite main side wall 11 with relatively larger areas than other walls. When a user wears the loudspeaker apparatus, one of the two opposite main side walls 11 may attach (or approximately attach) to the head, and the other opposite main side wall may be away from the head. The auxiliary side wall(s) 12 and end wall(s) 13 may be used to connect the two main side walls 11. When the user wears the loudspeaker apparatus, the auxiliary side wall(s) 12 may include two side walls facing an upper side and a lower side of the user's head. The end wall(s) 13 may include a side wall of the circuit housing 10 near one end of the ear hook 20 and a side wall of the circuit housing 10 near one end of the rear hook 30, wherein these two side walls may be opposite to each other and face a front side and back side of the user's head, respectively, when the user wears the loudspeaker apparatus. The main side wall(s) 11, the auxiliary side wall(s) 12, and the end wall(s) 13 may be connected to each other to form the circuit housing 10.

In some embodiments, the first protective housing 21 may include an open end 211. The open end 211 may be sleeved on at least a portion of the circuit housing 10. For example, the open end 211 may cover the end wall(s) 13 on the side of the circuit housing 10 facing the ear hook 20, and optionally a portion of the main side wall(s) 11 and the auxiliary side wall(s) 12 near the ear hook 20. The second protective housing 31 may include an open end 311. The open end 311 may be sleeved on at least a portion of the circuit housing 10. For example, the open end 311 may cover the end wall 13(s) on one side of the circuit housing 10 facing the rear hook 30 and optionally a portion of the main side wall(s) 11 and the auxiliary side wall(s) 12 near the rear hook 30. In some embodiments, the open end 211 and the open end 311 may be coupled with each other on the main side wall(s) 11 and the auxiliary side wall(s) 12 of the circuit housing 10 so as to cover the entire circuit housing 10.

In an exemplary application scenario, the first protective housing 21 and the second protective housing 31 may not completely cover the entire circuit housing 10. For example, an exposure hole may be disposed at the circuit housing 10 for mounting a button and/or a charging interface to facilitate user operation.

After the first protective housing 21 and the second protective housing 31 are placed outside the periphery of the circuit housing 10, the two protective housings may be fixed on the circuit housing 10 by a certain means, thereby fixing the circuit housing 10 to the protective housings.

Specifically, in some embodiments, an inner surface of the first protective housing 21 corresponding to the main side wall(s) may include positioning convex(es) 215. An inner surface of the second protective housing 31 corresponding to the main side wall(s) 11 may include positioning convex(es) 315. An outer surface of the main side wall(s) 11 may be provided with positioning concave(s) 111 matching the positioning convex(es) 215 and a positioning concave(s) 112 matching the positioning convex(es) 315.

The positioning convex(es) 215 may be located on an inner side wall near the open end 211. For example, the positioning convex(es) 215 may include a ring-shaped convex surrounding the inner side wall of the first protective housing 21, or a plurality of convexes disposed at intervals on the inner side wall of the first protective housing 21, which may be determined according to actual needs. In some embodiments, a count of the positioning convex(es) 215 may be two. The two positioning convexes 215 may be located on the inner side walls of the first protective housing 21 corresponding to two side walls 11 of the circuit housing 10, respectively. Similarly, a count of the positioning convex(es) 315 may also be two. The two positioning convexes 315 may be located on the inner side walls of the second protective housing 31 corresponding to the two main side walls 11 of the circuit housing 10, respectively.

In some embodiments, after the first protective housing 21 and the second protective housing 31 are sleeved on both sides of the circuit housing 10, respectively, the positioning convex(es) 215 may be embedded into the positioning concave(s) 111, and the positioning convex(es) 315 may be embedded into the positioning concave(s) 112, such that the open end 211 of the first protective housing 21 and the open end 311 of the second protective housing 31 may be elastically abutted together, thereby covering the circuit housing 10.

Further, in some embodiments, an outer side wall 313 of a region of the second protective housing 31 that covers the end wall(s) 13 of the circuit housing 10 may be arranged obliquely with respect to the auxiliary side wall(s) 12. Specifically, when the user wears the loudspeaker apparatus, a direction from a side of the outer side wall 313 of the second protective housing 31 near the upper side of the user's head to a side near the lower side of the user's head may be oblique in a direction away from the rear hook 30.

In some embodiments, the positioning convex(es) 215 and the positioning convex(es) 315 may be in the form of strips along the open end 211 and the open end 311, respectively, and may be arranged obliquely with respect to the auxiliary side wall(s) 12. Further, a seam 101 between the first protective housing 21 and the second protective housing 31 on the main side wall(s) 11 of the circuit housing 10 may also be arranged obliquely with respect to the auxiliary side wall(s) 12. The oblique directions the positioning convex(es) 215, the positioning convex(es) 315, and the seam 101 between the first protective housing 21 and the protective housing 31 on the main side wall(s) 11 of the circuit housing 10 may be the same as an oblique direction of the outer side wall 313 of the region of the second protective housing 31 that covers the end wall(s) 13 of the circuit housing 10, thereby making the loudspeaker apparatus more consistent in appearance.

In an exemplary application scenario, a cover area of one of the first protective housing 21 and the second protective housing 31 on the circuit housing 10 may be not less than half of a cover area of the other one of the first protective housing 21 and the second protective housing 31 on the circuit housing 10. For example, the cover area of the first protective housing 21 on the circuit housing 10 may be not less than half of the cover area of the second protective housing 31 on the circuit housing 10. Alternatively, the cover area of the second protective housing 31 on the circuit housing 10 may be not less than half of the cover area of the first protective housing 21 on the circuit housing 10. It should be noted that the cover area of the first protective housing 21 on the circuit housing 10, the cover area of the second protective housing 31 on the circuit housing 10, and the ratio between the two cover areas may be modified according to needs. For example, the two cover areas may be the same, which is not specifically limited here.

In some embodiments, the rear hook 30 may further include a plug end 33 facing an end of the circuit housing 10 as shown in FIG. 3. The second protective housing 31 may be sleeved on at least part of the plug end 33. Specifically, the plug end 33 may be injection-molded at an end of the second elastic wire. The rear hook protective sleeve 32 may be further injection-molded outside the second elastic wire and part of the plug end 33, and a second protective housing 31 may be integrally molded at the plug end 33, such that the second protective housing 31 may be sleeved on a peripheral region of the plug end 33 that is not covered by the rear hook protective sleeve 32.

Further, the circuit housing 10 may include a jack 14 facing the rear hook 30. The jack 14 may be located on an end wall 13 of the circuit housing 10 near the rear hook 30, and extended from a side of the end wall 13 near an auxiliary side wall 12 to the rear hook 30.

The plug end 33 may be at least partially inserted into the jack 14. Two slots 331 perpendicular to an insertion direction of the plug end 33 relative to the jack 14 may be located on opposite sides of the plug end 33, respectively. The plug end 33 may include two slots 331 disposed on two opposite sides of the plug end 33. The two slot 331 may be perpendicular to an insertion direction of the plug end 33 relative to the jack 14, and spaced apart from each other by a distance and arranged on the opposite sides of the plug end 33 symmetrically. Further, the two slots 331 may be connected to a side wall corresponding to the plug end 33 in a direction perpendicular to the insertion direction of the plug end 33.

Accordingly, a first side wall 15 of the jack 14 may be provided with a first through hole 151 corresponding to the positions of the two slots 331. The first side wall 15 of the jack 14 may be placed outside the periphery of the jack 14 and face the lower side of the user's head when the loudspeaker is worn by the user.

In some embodiments, the loudspeaker apparatus may further include a fixing component 53. The fixing component 53 may include two pins 531 disposed in parallel and a connecting part 532 for connecting the pins 531. In some embodiments, the two pins 531 may be disposed in parallel, and the connecting part 532 may be vertically connected to a same side of the two pins 531, thereby forming a U-shaped fixing component 53.

The pins 531 may be inserted into the slots 331 through the through hole from an outer side wall of the first side wall 15 of the jack 14 so as to block the connecting part 532 outside the jack 14, thereby achieving a plug connection between the circuit housing 10 and the rear hook 30.

In some embodiments, a second through hole 161 opposite to the first through hole 151 may be disposed on a second side wall 16 opposite to the first side wall 15 on the jack 14. The pins 531 may be further inserted into the second through hole 161 through the slots 331. The second side wall 16 may be an auxiliary side wall 12 of the circuit housing 10 near the jack 14, and when the loudspeaker apparatus is worn by the user, the auxiliary side wall 12 may face the upper side of the user's head.

In some embodiments, the pins 531 may be inserted into the slots 331 through the first through hole 151 and further inserted into the second through hole 161 through the slots 331. In other words, the pins 531 may completely penetrate and establish a connection between the plug end 33 and the two opposite side walls of the plug end 33, thereby achieving a more stable plug connection between the circuit housing 10 and the rear hook 30.

In some embodiments, the plug end 33 may be divided into a first plug section 332 and a second plug section 333 along an insertion direction of the plug end 33 relative to the jack 14. A cross-section area of the first plug section 332 may be larger than that of the second plug section 333 in a cross-sectional direction perpendicular to the insertion direction of the plug end 33 relative to the jack 14.

The rear hook protective sleeve 32 may be injection-molded on the first plug section 332 of the plug end 33, and the second protective housing 31 may be integrally injection-molded at a connected portion between the first plug section 332 and the second plug section 333. Further, the slots 331 may be located on the second plug section 333, and the second plug section 333 may be inserted into the jack 14. The plug end 33 may be exposed outside the jack 14.

In some embodiments, the first plug section 332 may include a first wiring duct 3321 extending along an insertion direction of the plug end 33 relative to the jack 14. The second plug section 333 may include a second wiring duct 3331 located on an outer end surface of the second plug section 333 that is far from the first plug section 332. The second wiring duct 3331 may extend along a direction perpendicular to the insertion direction of the plug end 33 and penetrate at least one outer side. Specifically, the first wiring duct 3321 may be located on a side of the first plug section 332 near the auxiliary side wall(s) 12 of the jack 14, and penetrate both end surfaces of the first plug section 332 along the insertion direction of the plug end 33 relative to the jack 14. The second wiring duct 3331 may penetrate two outer sides of the second plug section 333 perpendicular to an extending direction of the second wiring duct 3331.

In addition, an inner side wall of the jack 14 may include a third wiring duct 162 with one end connected to the first wiring duct 3321 and the other end connected to the second wiring duct 3331. The third wiring duct 162 may be formed by recessing an inner wall surface of the second side wall 16.

In some embodiments, the circuit housing 10 may include an inner partition wall 17 inside the housing to form an accommodating cavity 18 spaced apart from the jack 14. Specifically, the main side wall(s) 11, the auxiliary side wall(s) 12, and the end wall(s) 13 of the circuit housing 10 may form an accommodating space. The inner partition wall 17 may divide the accommodating space into two parts including the accommodating cavity 18 and the jack 14. The inner partition wall 17 may further include a wiring hole 171 connecting the jack 14 and the accommodating cavity 18.

In some embodiments, the loudspeaker apparatus may further include a rear hook wire 34. The rear hook wire 34 may pass through the rear hook 30. Two ends of the rear hook wire 34 may be connected to the control circuit 51 and the battery 52, respectively. Specifically, the rear hook wire 34 may pass through the rear hook 30, the first wiring duct 3321, the third wiring duct 162, and the second wiring duct 3331 successively, and then pass through the wiring hole 171 and enter the accommodating cavity 18, so as to connect to the control circuit 51 or the battery 52.

It should be noted that the above description of the earphone core housing of the loudspeaker apparatus is only a specific example, and should not be regarded as the only feasible implementation solution. Obviously, for those skilled in the art, after understanding the basic principle of earing of an earphone core of the loudspeaker apparatus, it is possible to make various modifications and alterations in the form and details of the structure and/or related methods of the earphone core housing (or a portion thereof) without departing from this principle, but these amendments and alterations are still within the scope described above. For example, the circuit housing may be integrated with the rear hook. All such variations are within the protection scope of the present disclosure.

Figure 5:
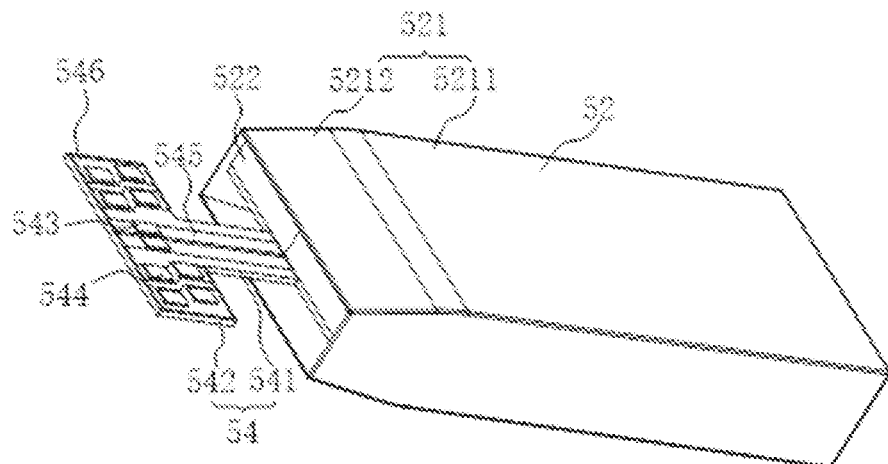
FIG. 5 is a schematic diagram illustrating an exemplary battery component of a loudspeaker apparatus according to some embodiments of the present disclosure.
Figure 6:
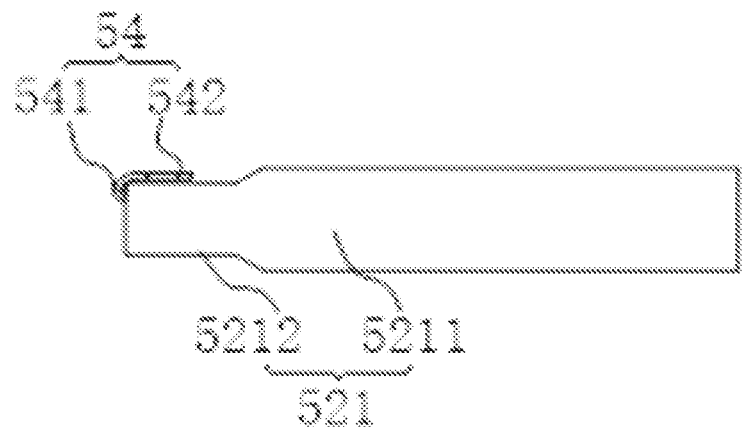
FIG. 6 is a schematic diagram illustrating a side view of the battery component illustrated in FIG. 5 according to some embodiments of the present disclosure.
Figure 7:
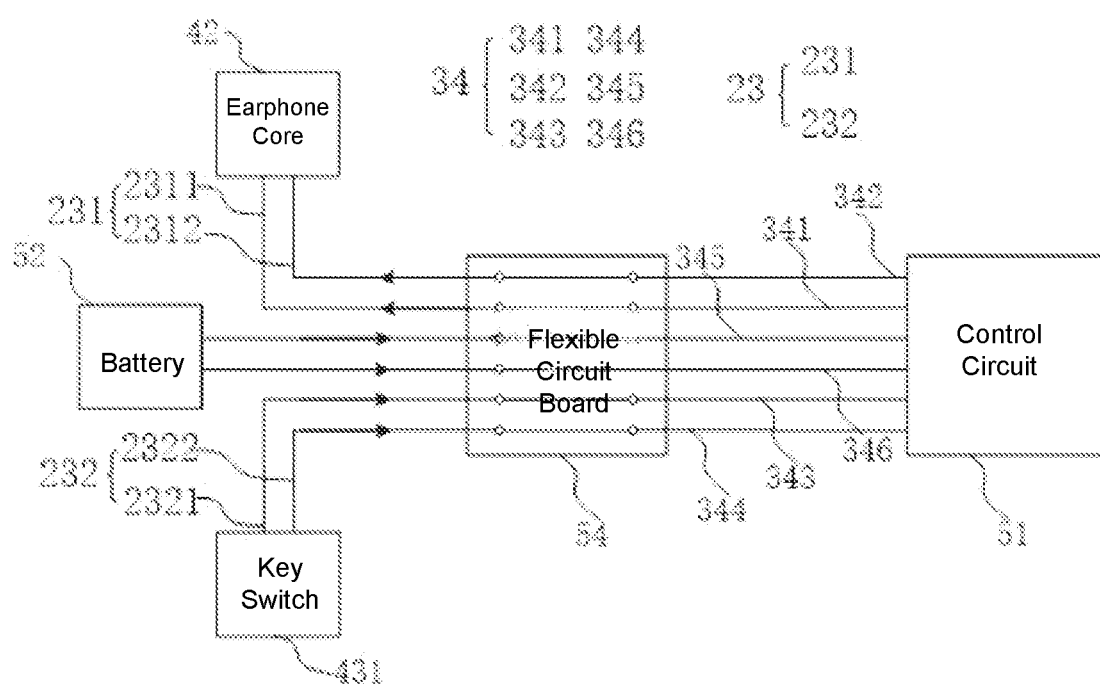
FIG. 7 is a schematic diagram illustrating an exemplary wiring in a flexible circuit board of the battery component illustrated in FIG. 5 according to some embodiments of the present disclosure.

FIG. 5 is a schematic diagram illustrating an exemplary battery component of a loudspeaker apparatus according to some embodiments of the present disclosure. FIG. 6 is a schematic diagram illustrating a side view of the battery component illustrated in FIG. 5 according to some embodiments of the present disclosure. FIG. 7 is a schematic diagram illustrating an exemplary wiring in a flexible circuit board of the battery component illustrated in FIG. 5 according to some embodiments of the present disclosure. In some embodiments, the circuit housing 10 may include a first circuit housing 10a (as shown in FIG. 1) and a second circuit housing 10b (as shown in FIG. 1). The loudspeaker apparatus may further include a flexible circuit board 54 which may be accommodated together with the battery 52 in the accommodating cavity 18 (as shown in FIG. 4) of the first circuit housing 10a. The flexible circuit board 54 may be a Flexible Printed Circuit (FPC). The battery 52 may include a positive terminal and a negative terminal.

The flexible circuit board 54 may include a first board 541 and a second board 542. One end of the first board 541 may be fixed to the battery 52, and the other end may be connected to the second board 542. The flexible circuit board 54 may be integrated as a whole, with the first board 541 and the second board 542 as two regions thereof. The second board 542 may include a bonding pad and a flexible lead connecting the bonding pad. The first board 541 may only include a flexible lead for connecting a corresponding bonding pad on the second board 542 to the battery 52. As shown in FIG. 6, the first board 541 may be bent because the first board 541 only includes a flexible lead, such that the position of the flexible circuit board 54 may be adjusted according to needs.

In some embodiments, a plurality of bonding pads, which may be spaced apart from each other, may be placed on the second board 542. The plurality of bonding pads may include two first bonding pads 543 and a plurality of second bonding pads 544. The first board 541 and the second board 542 may be provided with two first flexible leads 545. The two first bonding pads 543 may be electrically connected to the positive terminal and the negative terminal of the battery 52 by the two first flexible leads 545, respectively.

In some embodiments, the plurality of second bonding pads 544 may be divided into at least two groups. A count of second bonding pads 544 in each group may be determined according to actual needs. For example, the count of second bonding pads 544 in each group may be two, and the two second bonding pads 544 may be electrically connected to each other by a second flexible lead 546 disposed on the second board 542. Each of the two second bonding pads 544 in each group may be connected to a functional component by wires, and then the two functional components corresponding to the two second bonding pads 544 in one group may be connected through the second flexible lead 546.

In some embodiments, the bonding pads for circuit switching may be located on the second board 542 of the flexible circuit board 54, and connected to the battery 52 through the first board 541 of the flexible circuit board 54, such that the first board 541 may be bent according to actual conditions (e.g., the available space, etc.) to place the second board 542, thereby optimizing a space utilization of the accommodating cavity 18 of the first circuit housing 10a and improving a space utilization rate. The two first bonding pads 543 may be directly connected to the positive terminal and the negative terminal of the battery 52 through the first flexible lead 545 on the flexible circuit board 54 instead of using additional bonding pads to lead the positive and negative terminals of the battery 52, thereby reducing the count of bonding pads and simplifying the equipment structure and related processes.

In some embodiments, the first board 541 may be folded to cause the second board 542 attached to a side surface of the battery 52, such that the first board 541 and the battery 52 may be stacked, thereby greatly reducing the space occupied by the battery 52 and the flexible circuit board 54.

Specifically, the battery 52 may include a battery core 521. The battery core 521 may include a body region 5211 and a sealing region 5212. The body region 5211 and the sealing region 5212 may be tiled. The thickness of the body region 5211 may be greater than that of the sealing region 5212, such that a side surface of the sealing region 5212 and a side surface of the body region 5211 may form a step.

Specifically, the side surfaces of the sealing region 5212 and the body region 5211 in a thickness direction of the battery core 521 may form a step, such that the second board 542 may make use of a space formed by the body region 5211 and the sealing region 5212 of the battery core 521 without providing extra space for placing the flexible circuit board 54, thereby further improving the space utilization rate.

In some embodiments, the battery 52 may further include a hard circuit board 522, which may be arranged on a side surface of the sealing region 5212 of the battery core 521. Specifically, the positive and negative terminals may be arranged on the hard circuit board 522, and a protection circuit (not shown) may further be arranged on the hard circuit board 522 to protect the battery 52 from overload.

In some embodiments, an end of the first board 541 far from the second board 542 may be fixedly attached to the rigid circuit board 522, such that two flexible leads on the first board 541 may be connected to the positive terminal and the negative terminal on the hard circuit board 522. Specifically, the first board 541 and the hard circuit board 522 may be directly pressed together during manufacturing.

Further, the shapes of the first board 541 and the second board 542 may be determined according to actual conditions. In some embodiments, the shape of the first board 541 may match that of the sealing area 5212 of the battery core 521, and both of them may have the shape of rectangles. The shape of the second board 542 may also be rectangular. The second board 542 may be disposed at one end in a length direction of the first board 541, and perpendicular to the first board 541 along the length direction. Further, the first board 541 may be connected to a middle region of the second board 542 in a length direction, such that the first board 541 and the second board 542 may be of a T shape.

The arrangement of the first bonding pads 543 and the second bonding pads 544 on the second board 542 may be various, for example, all the bonding pads may be arranged along a straight line, or arranged according to another shape.

In some embodiments, the two first bonding pads 543 may be arranged side by side in a middle region of the second board 542 along a length direction of the second board 542. The plurality of second bonding pads 544 may be further distributed on both sides of the two first bonding pads 543 along the length direction of the second board 542. And the second bonding pads 544 in each group may be arranged adjacently.

In some embodiments, the second bonding pads 544 in each group may be spaced apart from each other by interval arranged along a width direction of the second board 542, and may be staggered from each other along the length direction of the second board 542, such that the second bonding pads 544 in each group may be arranged like a step. In this way, an interval region at an even level between two adjacent groups of second bonding pads 544 may be avoided, such that an intensity distribution of the second board 542 may be more uniform, thereby reducing the occurrence of bending between the two adjacent groups of second bonding pads 544 and a breaking probability of the second board 542 due to bending, which may protect the second board 542. Moreover, a distance between different bonding pads may be increased, thereby facilitating soldering, and reducing short circuits between different bonding pads.

The present disclosure also provides a battery assembly. In some embodiments, the battery assembly may include the battery 52 and the flexible circuit board 54. The battery assembly in some embodiments may be applied in an apparatus that needs a circuit switching at the battery 52, such as a headphone, MP3, etc. For example, the battery assembly may be applied in the loudspeaker apparatus in the present disclosure.

Further, in some embodiments, the rear hook 30 may be connected to one end of the first circuit housing 10a, and include a plurality of rear hook wires 34 (as shown in FIG. 4). The ear hook 20 may be connected to the other end of the first circuit housing 10a, and include a plurality of ear hook wires 23.

In some embodiments, each group of the second bonding pads 544 may include two second bonding pads 544. The ear hook wires 23 and the corresponding rear hook wires 34 may be electrically connected to two second bonding pads 544 in a same group of the second bonding pads 544, respectively. Further, functional element(s) connected to the rear hook wires 34 and functional element(s) connected to the ear hook wires 23 may be connected by connecting the second flexible lead 546 of the two second bonding pads 544 in each group.

In some embodiments, an earphone core housing 41 may further accommodate function module(s), such as a key switch 431, etc. In addition, the control circuit 51 may be accommodated in a second circuit housing 10b. The second board 542 may include four groups of second bonding pads 544.

The ear hook wires 23 may include two audio signal wires 231, that is, a first ear hook wire 2311 and a second ear hook wire 2312 both connected to the earphone core 42. The rear hook wires 34 may include a first rear hook wire 341 and a second rear hook wire 342 connected to the control circuit 51 and used to transmit audio signals to the earphone core 42. The first ear hook wire 2311 and the first rear hook wire 341, the second ear hook wire 2312 and the second rear hook wire 342 may be connected to different bonding pads in different groups of the second bonding pads 544, respectively. Specifically, the first ear hook wire 2311 and the first rear hook wire 341 may be connected to two second bonding pads 544 in a same group of the second bonding pads 544, respectively. The second ear hook wire 2312 and the second rear hook wire 342 may be connected to two second bonding pads 544 of another group of the second bonding pads 544, respectively. In this way, the earphone core 42 and the control circuit 51 may be electrically connected to transmit audio signals.

In addition, the ear hook wire 23 may include at least two auxiliary signal wires 232, for example, a third ear hook wire 2321 and a fourth ear hook wire 2322 which are both connected to the key switch 431. The rear hook wire 34 may further include a third rear hook wire 343 and a fourth rear hook wire 344 connected to the control circuit 51 for transmitting key signals to the key switch 431. The third ear hook wire 2321 and the third rear hook wire 343, the fourth ear hook wire 2322 and the fourth rear hook wire 344 may be connected to different second bonding pads 544 in different groups of the second bonding pads 544, respectively. The third ear hook wire 2321 and the third rear hook wire 343 may be connected to two second bonding pads 544 in a same group of the second bonding pads 544, respectively. The fourth ear hook wire 2322 and the fourth rear hook wire 344 may be connected to two second bonding pads 544 in another group of the second bonding pads 544, respectively. In this way, the key switch 431 may be electrically connected to the control circuit 51 to transmit key signals. In some embodiments, the two groups of the second bonding pads 544 for transmitting key signals may be different from the two groups of the second bonding pads 544 for transmitting audio signals to the earphone core 42.

In some embodiments, the rear hook wires 34 may include a fifth rear hook wire 345 and a sixth rear hook wire 346 connected to the control circuit 51 and used to supply power to the control circuit 51. The fifth rear hook wire 345 and the sixth rear hook wire 346 may be connected to the two first bonding pads 543, respectively, such that the battery 52 may be connected to the control circuit 51.

It should be noted that the above description of the battery module of the loudspeaker apparatus is only a specific example, and should not be considered as the only feasible implementation solution. Obviously, for those skilled in the art, after understanding the basic principle of the battery module of the loudspeaker apparatus, it is possible to make various modifications and alterations in the form and details of the structure and related methods of the battery module of the loudspeaker apparatus without departing from this principle, but these modifications and alterations are still within the scope described above. For example, the earphone core housing 41 may further accommodate auxiliary function modules such as a voice control module and a microphone module. All such variations are within the protection scope of the present disclosure.

Figure 8:
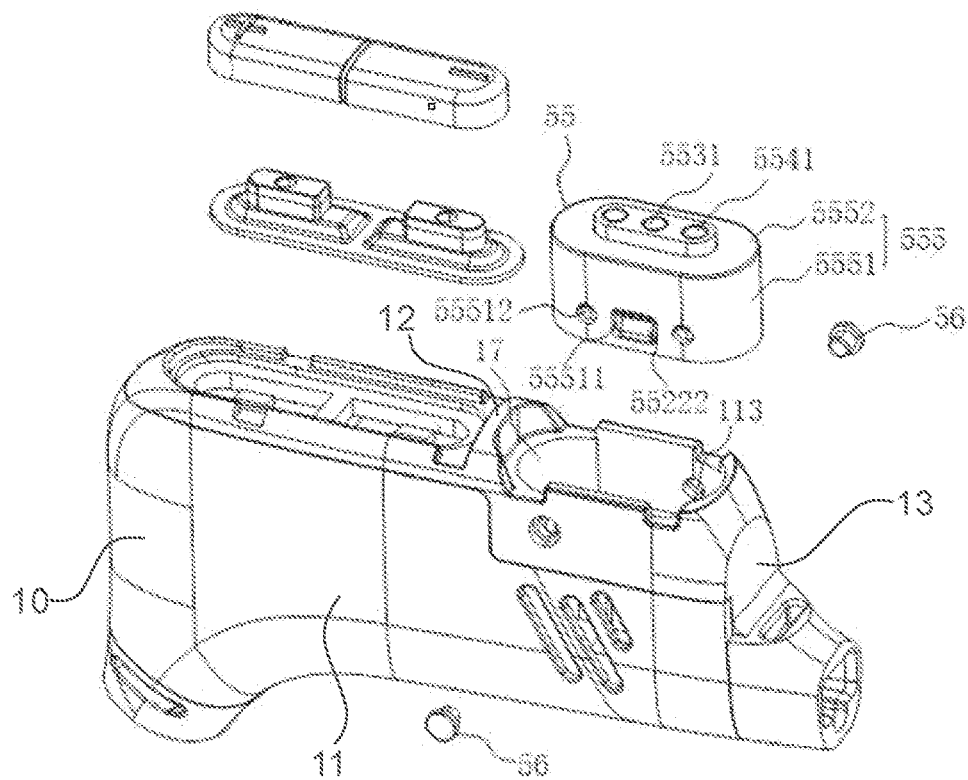
FIG. 8 is a schematic diagram illustrating an exploded view of a portion of a loudspeaker apparatus according to some embodiments of the present disclosure.
Figure 9:
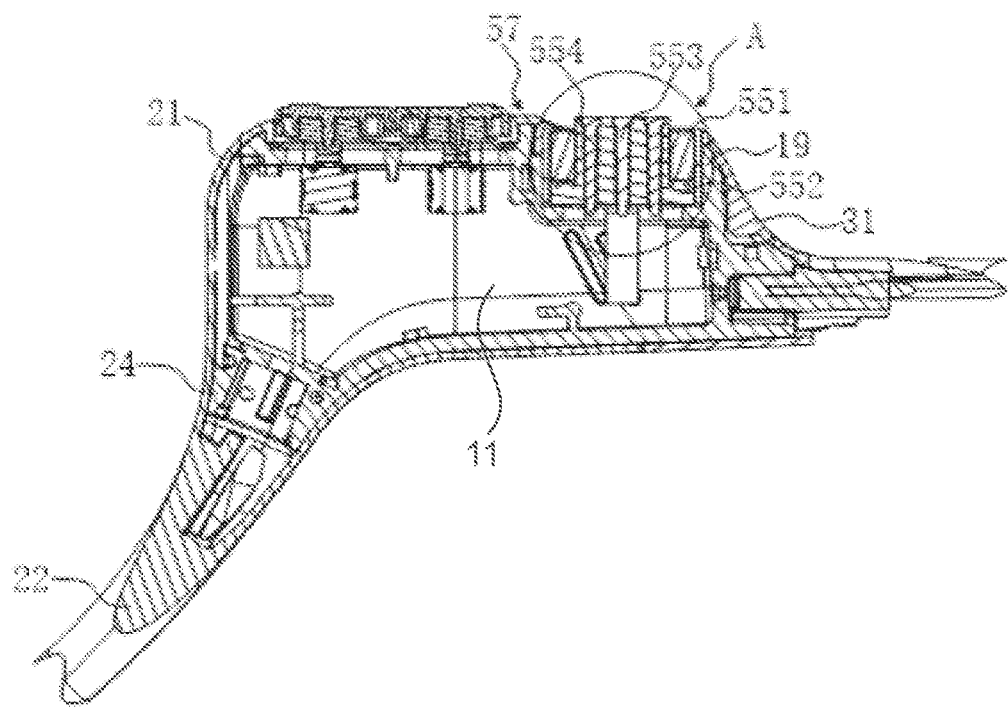
FIG. 9 is a schematic diagram illustrating a cross-sectional view of a portion of the loudspeaker apparatus as shown in FIG. 8 according to some embodiments of the present disclosure.

FIG. 8 is a schematic diagram illustrating an exploded view of a portion of a loudspeaker apparatus according to some embodiments of the present disclosure. FIG. 9 is a schematic diagram illustrating a cross-sectional view of a portion of the loudspeaker apparatus as shown in FIG. 8 according to some embodiments of the present disclosure. As shown in FIG. 8 and FIG. 9, the loudspeaker apparatus may include a magnetic connector 55. The magnetic connector 55 may be used together with a charging interface of a charger to charge the loudspeaker apparatus. Specifically, when charging the loudspeaker apparatus, the magnetic connector 55 and the charging interface of the charger may match each other and be adsorbed together to establish an electrical connection to charge the loudspeaker apparatus. In some embodiments, the magnetic connector 55 may include a magnetic adsorption ring 551, an insulation base 552, a first terminal 553, and a second terminal 554.

The magnetic adsorption ring 551 may be a magnet, and the magnetic polarities of an outer end and an inner end may be different. As used herein, an outer end of a component of a loudspeaker apparatus refers to an end that is closer to the environment of the loudspeaker apparatus (e.g., exposed from the loudspeaker apparatus), and an inner end of the component refers to an end that is further from the environment of the loudspeaker apparatus (e.g., located inside the loudspeaker apparatus). The power interface of the charger may have a magnetic adsorption structure that matches the magnetic adsorption ring 551. The charging interface of the charger may have a magnetic adsorption structure that matches the magnetic adsorption ring 551. The magnetic adsorption structure may include one or more magnetic materials. For example, the magnetic adsorption structure may include iron, or the like, which may be adsorbed with the magnetic adsorption ring 551 whether the outer end of the magnetic adsorption ring 551 is the south pole or the north pole. As another example, the magnetic adsorption structure may include a magnet. The magnetic adsorption ring 551 and the magnetic adsorption structure may be adsorbed together only when the magnetic polarity of the outer end of the magnetic adsorption structure and the magnetic polarity of the outer end of the magnetic adsorption ring 551 are opposite. When the magnetic connector 55 and the charging interface are adsorbed with each other, a terminal of the magnetic connector 55 may contact a corresponding terminal of the charging interface, and an electrical connection may be established between the magnetic connector 55 and the charging interface.

In some embodiments, the outer end of the magnetic adsorption ring 551 may have a ring shape. The magnetic adsorption ring 551 and the magnetic adsorption structure of the charging interface may be adsorbed together via the ring-shaped outer end. Due to the hollow design of the ring-shaped outer end, the magnetic adsorption ring 551 may be adsorbed with the charging interface and confined by magnetic forces in different directions. This may improve the stability of the electrical connection between the magnetic adsorption ring 551 and the charging interface of the charger.

Figure 10:
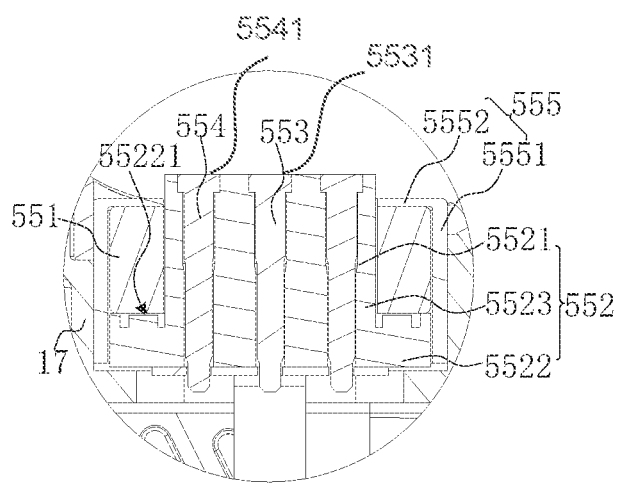
FIG. 10 is a schematic diagram illustrating an enlarged view of a portion A in FIG. 9 according to some embodiments of the present disclosure.

FIG. 10 illustrates a partially enlarged view of a portion A in FIG. 9 according to some embodiments of the present disclosure. In some embodiments, at least part of the insulation base 552 may be inserted into the magnetic adsorption ring 551 to fix the magnetic adsorption ring 551. The insulation base 552 may include at least two accommodation holes 5521. The extending direction of the at least two accommodation holes 5521 may be parallel to the height direction of the insulation base 552. The at least two accommodation holes 5521 may penetrate an outer end of the insulation base 552. In some embodiments, the insulation base 552 may include one or more insulating materials, such as PC or PVC.

Further, the first terminal 553 and the second terminal 554 may both have a shape of a cylinder. The count of the terminals may be equal to the count of the accommodation holes 5521. Each of the terminals may be inserted into one of the accommodation holes 5521. An outer end of a terminal may be exposed from the top surface of the insulation base 552 through the corresponding accommodation hole 5521, that is, the outer end of the terminal may be visible seen from a direction facing the top surface of the insulation base 552. The outer end of a terminal of the magnetic connector 55 may flush with the top surface of the insulation base 552 to form a contact surface 5531 and a second contact surface 5541. The first terminal 553 and the second terminal 554 may correspond to the positive and negative terminals of the charging interface, respectively. Correspondingly, the first contact surface 5531 and the second contact surface 5541 may contact with the charging interface to establish an electrical connection.

In some embodiments, when the magnetic connector 55 and the charging interface are adsorbed with each other, the magnetic connector 55 may be restricted by magnetic forces from different directions applied by the hollow ring-shaped magnetic adsorption ring 551, such that the situation that a "solid" surface is easily staggered, deviated, and cannot be accurately positioned may be reduced. The first contact surface 5531 and the second contact surface 5541 may be accurately positioned and contact with the charging interface to establish an electrical connection. This may improve the accuracy of the electrical connection between the magnetic adsorption ring 551 and the charging interface of the charger.

In some embodiments, the insulation base 552 may include a supporting member 5522 and an insertion member 5523. The supporting member 5522 and the insertion member 5523 may be located along a direction parallel to an axis of the accommodation hole 5521. A cross-section area of the supporting member 5522 may be larger than that of the insertion member 5523, thereby forming a supporting table 55221.

The outer side wall of the insertion member 5523 may match the inner side wall of the magnetic adsorption ring 551, such that the insertion member 5523 may be inserted into the magnetic adsorption ring 551 to fix the magnetic adsorption ring 551. Two ends of an accommodation hole 5521 of the insulation base 552 may run through an outer end of the insertion member 5523 and an outer end of the supporting member 5522 away from each other, such that the first terminal 553 and the second terminal 554 may run through the entire insulation base 552. Further, the first terminal 553 and the second terminal 554 may be exposed from the outer end of the insertion member 5523 away from the supporting member 5522 to connect with an internal circuit.

Specifically, the insertion member 5523 may be inserted into the magnetic adsorption ring 551 from an end away from the supporting member 5522, and an inner end (i.e., an end opposite to its outer end) may be supported by the support table 55221. The dimension of an outer side of the magnetic adsorption ring 551 may match that of the supporting member 5522, so as to achieve a uniform structure of the magnetic connector.

In some embodiments, the magnetic connector 55 may further include a housing 555. The housing 555 may be sleeved on the periphery of the insulation base 552 and magnetic adsorption ring 551, so that the magnetic connector 55 may be assembled on the charging interface of the loudspeaker apparatus as a whole.

The housing 555 may include one or more non-magnetic metal materials (e.g., copper, aluminum, and/or aluminum alloy), a plastic material, or the like, or any combination thereof.

In some embodiments, a housing 555 of the magnetic connector 55 may be made of metal so as to obtain a thin housing satisfying a strength requirement, thereby reducing an occupation of space.

Specifically, the housing 555 may include a body 5551 and a flange 5552 located at the outer end of the body 5551 and protruding into the body 5551. The outer end of the housing 555 may be partially open due to the flange 5552, and the inner end of the housing 555 may be completely open. The inner surface of the body 5551 may match the outer surface of the magnetic member ring 551 and the supporting member 5522 of the insulation base 552. The flange 5552 may cover the outer end of the magnetic adsorption ring 551. The first contact surface 5531 of the first terminal 553 and the second contact surface 5541 of the second terminal 554 may be exposed, such that the housing 555 may be sleeved on the periphery of the insulation base 552, the first terminal 553, the second terminal 554, and the magnetic adsorption ring 551 through the inner end. The flange 5552 may cover an end of the magnetic adsorption ring 551 away from the supporting member 5522. The first contact surface 5531 and the second contact surface 5541 may be exposed through the partially opening end for establishing an electrical connection to the charging interface.

In some embodiments, the outer end of the insertion member 5523 of the insulation base 552 far from the supporting member 5522 may be protruded from the end of the magnetic adsorption ring 551 far from the supporting member 5522. The shape of the partially opening end formed by the flange 5552 may match the shape of the periphery of the insertion member 5523, so that the end of the insertion member 5523 far from the supporting member 5522 may extend through the partially opening end of the housing 555 to the outside of the housing 555.

In some alternative embodiments, the outer end of the insertion member 5523 of the insulation base 552 may be sunken relative to the outer end of the flange 5552.

It should be noted that the magnetic connector 55 in this embodiment may be applied to a charging interface of an electronic device or a charging interface of a charger, so as to cooperate with a charging interface of a corresponding charger or an electronic device to supply power to the electronic device. In some embodiments, the top surface of the insulation base 552 may be protruded or sunken relative to the top surface of the flange 5552, such that the magnetic connector 55 may protrude into the corresponding charging interface so as to form a connection between the magnetic connector 55 and the corresponding charging interface, such that a connection between the magnetic connector 55 and the corresponding charging interface may be more stable.

Further, in some embodiments, the outer peripheral wall of the supporting member 5522 and the inner peripheral wall of the body 5551 may be mechanically connected to each other via a buckle connection. The buckle connection may improve the stability of the mechanical connection between the housing 555, the insulation base 552, and the magnetic adsorption ring 551, thereby improving the stability of the magnetic connector 55.

Specifically, in an exemplary application scenario, two through grooves 55511 may be located on two opposite surfaces of the outer peripheral wall of the body 5551, respectively. Correspondingly, the supporting member 5522 may include two buckles 55222 matching the two through grooves 55511. The housing 555 may be sleeved on the supporting member 5522 of the insulation base 552 via the buckle connections between the through grooves 55511 and the buckles 55222. For example, when assembling the magnetic connector 55, the housing 555 may be sleeved on the periphery of the insulation base 552, and a buckle of the supporting member 5522 may be buckled on a side wall of a corresponding through groove 55511, thereby fixing the housing 555 on the periphery of the outer peripheral wall of the supporting member 5522.

It should be noted that the specific shape of the magnetic adsorption ring 551 in some embodiments may be modified according to different needs.

In some embodiments, the outer end of the magnetic adsorption ring 551 may be rotationally symmetrical with respect to a preset symmetry point. When the magnetic adsorption ring 551 rotates, the first contact surface 5531 and the second contact surface 5541 may rotate together with the magnetic adsorption ring 551. The first contact surface 5531 and the second contact surface 5541 before rotating may at least partially overlap the first contact surface 5531 and the second contact surface 5541 after rotating. That is, the surface formed by the first contact surface 5531 and the second contact surface 5541 may be or close to rotationally symmetrical with respect to the same preset symmetry point. The shape of the outer end of the magnetic adsorption ring 551 and the angle of rotation symmetry may be determined based on the arrangement of the first contact surface 5531 and the second contact surface 5541.

For example, the outer end of the magnetic adsorption ring 551 may have a shape of a circular ring, an elliptical ring, a rectangular ring, etc., as long as it is consistent with the arrangement of the first contact surface 5531 and the second contact surface 5541 such that the first contact surface 5531 and the second contact surface 5541 before the symmetrical rotation may partially overlap the second contact surface 5541 after the symmetrical rotation.

Due to the rotationally symmetrical shape of the outer end of the magnetic adsorption ring 551, the magnetic adsorption ring 551 may be moved back to its original position after a symmetrical rotation. The magnetic adsorption ring 551 may have at least two assembly positions relative to the first contact surface 5531 and the second contact surface 5541, and the magnetic connector 55 and the charging interface may be adsorbed with each other at a plurality of rotation angles to establish an electrical connection.

Specifically, as shown in FIG. 10, in some embodiments, the outer end of the magnetic adsorption ring 551 may have a shape of a circular ring with the center as the symmetry point. The first contact surface 5531 and the second contact surface 5541 may respectively have a shape of a circular or a circular ring concentrically arranged with the magnetic adsorption ring 551.

When the magnetic adsorption ring 551 rotates symmetrically at any angle with respect to the symmetry point, both the first contact surface 5531 and the second contact surface 5541 before rotating may completely overlap the first contact surface 5531 and the second contact surface 5541 after rotating. In assembling, the magnetic adsorption ring 551 may be sleeved on the periphery of the inserting portion 5523 of the insulation base 552 concentrically with the first contact surface 5531 and the second contact surface 5541 without referring other positions. When the magnetic adsorption ring 551 absorbs a corresponding magnetic adsorption structure of the charging interface, the first contact surface 5531 and the second contact surface 5541 may be corresponding to a positive terminal and a negative terminal of the charging interface, respectively, and the magnetic connector 55 and the charging interface may be adsorbed with each other without further calibration, which is convenient for users.

Figure 11:
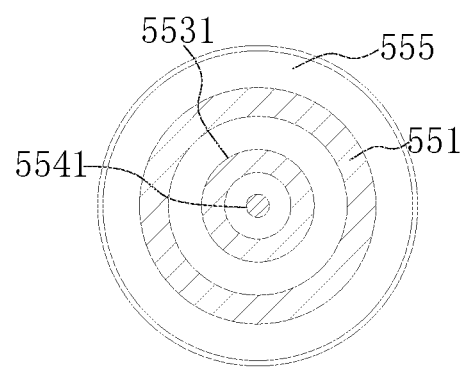
FIG. 11 is a schematic diagram illustrating a first top view of a magnetic connector of a loudspeaker apparatus according to some embodiments of the present disclosure.

In some embodiments, as shown in FIG. 11, the first contact surface 5531 and the magnetic adsorption ring 551 may be arranged as two concentric circles, and the second contract surface 5541 may be arranged as a point located at the center of the first contact surface 5531 and the magnetic adsorption ring 551. When the magnetic adsorption ring 551 rotates, the first contact surface 5531 before rotating may be completely overlap itself after rotating, and the second contract surface 5541 before rotating may be completely overlap itself after rotating.

Figure 12:
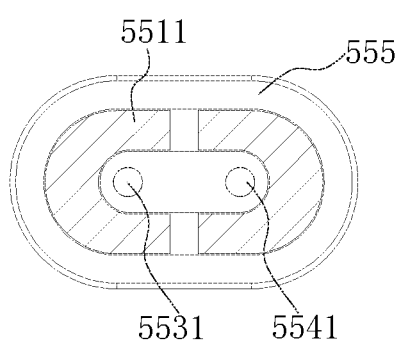
FIG. 12 is a schematic diagram illustrating a second top view of a magnetic connector of a loudspeaker apparatus according to some embodiments of the present disclosure.

In some embodiments, as shown in FIG. 12, the count of the first contact surface 5531 may be one, and the count of the second contact surface 5541 may be one. The first contact surface 5531 and the second contact surface 5541 may be arranged in a 180 degrees rotationally symmetrical shape with respect to the symmetry point. When the magnetic adsorption ring 551 rotates 180 degrees, the first contact surface 5531 after rotating may completely overlap the second contact surface 5541 before rotating, and the second contact surface 5541 after rotating may completely overlap the first contact surface 5531 before rotating.

Figure 13:
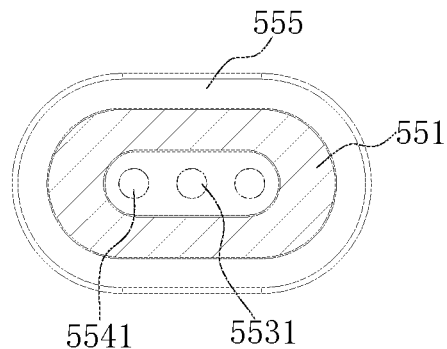
FIG. 13 is a schematic diagram illustrating a third top view of a magnetic connector of a loudspeaker apparatus according to some embodiments of the present disclosure.

In some embodiments, as shown in FIG. 13, the count of the first contact surface 5531 may be one, and the count of the second contact surface 5541 may be two. The outer end of the magnetic adsorption ring 551 may have a 180 degrees rotationally symmetrical shape with respect to the symmetry point. When the magnetic adsorption ring 551 rotates 180 degrees, the first contact surface 5531 and the second contact surface 5541 before rotating may at least partially overlap the first contact surface 5531 and the second contact surface 5541 after rotating, respectively. In some embodiments, a dimension of the magnetic adsorption ring 551 in a first direction passing through the symmetry point may be different from a dimension of the magnetic adsorption ring 551 in a second direction perpendicular to the first direction passing through the symmetry point. For example, the outer end of the magnetic adsorption ring 551 may have a shape of an elliptical ring, a rectangular ring, or the like.

In some embodiments, the dimension of the magnetic adsorption ring 551 in the first direction may be greater than that in the second direction. The count of the first contact surface 5531 may be one, and the first contact surface 5531 may be located at the symmetry point of the magnetic adsorption ring 551. The count of the second contact surface 5541 may be two. When the magnetic adsorption ring 551 rotates with respect to the symmetry point, the two second contact surfaces 5541 may rotate with respect to the first contact surface 5531. When the magnetic adsorption ring 551 rotates 180 degrees, the two second contact surfaces 5541 may swap positions with each other.

Further, the two second contact surfaces 5541 may be on both sides of the symmetry point along the first direction. When the magnetic adsorption ring 551 rotates 180 degrees, any one of the two second contact surfaces 5541 before rotating may at least partially overlap the other second contact surface 5541 after rotating. Since the two contact surfaces are along the first direction, the two second contact surfaces 5541 may be located in a same straight line before or after rotating, and may swap positions with each other. That is, one of the second contact surfaces 5541 after rotating may be located on a position of the other second contact surface 5541 before rotating. Therefore, when any one of the two second contact surfaces 5541 before rotating at least partially overlaps another second contact surface 5541 after rotating, the two second contact surfaces 5541 before rotating may at least partially overlap the two second contact surfaces 5541 after rotating.

Specifically, the first contact surface 5531 and the two second contact surfaces 5541 may be 180 degrees rotationally symmetric with respect to the symmetry point, that is, the first contact surface 5531 and the second contact surface 5541 may be 180 degrees rotationally symmetric with respect to a center point of the first contact surface 5531, such that the first contact surface 5531 and the second contact surface 5541 before a symmetrical rotation may completely overlap the first contact surface 5531 and the second contact surface 5541 after the symmetrical rotation. And when rotating in other degrees, the first contact surface 5531 and the second contact surface 5541 before a symmetrical rotation may not completely overlap the first contact surface 5531 and the second contact surface 5541 after the symmetrical rotation.

In some embodiments, a shape of the first contact surface 5531 may be the same as or different from that of the second contact surface 5541. While shapes of the two second contact surfaces 5541 may be the same. For example, the first contact surface 5531 and the second contact surface 5541 may be circular surfaces, or may be other surfaces that can completely overlap after being rotated 180 degrees with respect to the center point of the first contact surface 5531.

In this way, before and after the symmetrical rotation in 180 degrees with respect to the symmetry point, the magnetic adsorption ring 551 may face two opposite directions. At the same time, the first contact surface 5531 and the second contact surface 5541 before the symmetrical rotation in 180 degrees may at least partially overlap the first contact surface 5531 and the second contact surface 5541 after the symmetrical rotation in 180 degrees. Accordingly, when the magnetic connector 55 is assembled, the magnetic adsorption ring 551 may be sleeved on the periphery of the insertion member 5523 of the insulation base 552 having the first terminal 553 and the second terminal 554 in two opposite directions, thereby facilitating assembly. In addition, when coupling the magnetic connector 55 and the corresponding charging interface, the magnetic connector 55 may be coupled with the corresponding charging interface in two opposite directions, which may be convenient for users.

In some embodiments, the magnetic adsorption ring 551 may be divided into at least two ring sections 5511 in the circumferential direction. The outer ends of the adjacent ring sections 5511 may have different magnetic polarities.

The division of ring section 5511 may be performed according to a certain rule. For example, if the outer end of the magnetic adsorption ring 551 has an annular shape, the magnetic adsorption ring 551 may be equally divided along its radial direction. Merely by way of example, the magnetic adsorption ring 551 may be quartered into four ring sections 5511 with the same shape. As another example, the magnetic adsorption ring 551 may be divided randomly, which is not specifically limited here.

Specifically, in actual use, it is necessary to contact the first contact surface 5531 and the second contact surface 5541 with exposed surfaces of corresponding terminals of the corresponding charging interface, thereby establishing an electrical connection between the magnetic connector 55 and the corresponding charging interface, and supplying power to the loudspeaker apparatus. When the first contact surface 5531, the second contact surface 5541, and the exposed surfaces of the terminals in the corresponding charging interface are incorrectly connected, a correct electrical connection between the magnetic connector 55 and the corresponding charging interface may not be established, and the power may not be supplied to the loudspeaker apparatus.

In some embodiments, the magnetic polarity of the outer end of each ring section 5511 may be determined according to the connection between the contact surface(s) (e.g., the first contact surface 5531 and/or the second contact surface 5541) and the terminal(s) of the charging interface. When a connection between the contact surface(s) (e.g., the first contact surface 5531 and/or the second contact surface 5541) and the terminal(s) of the charging interface is a valid connection, the magnetic polarity of the outer end of each ring section 5511 may be opposite to that of the outer end of a corresponding magnetic adsorption structure of the charging interface. The contact surface(s) (e.g., the first contact surface 5531 and/or the second contact surface 5541) can be adsorbed with the terminal(s) of the charging interface because the magnetic polarity of the outer end of each ring section 5511 may be different from that of the outer end of a corresponding magnetic adsorption structure of the charging interface. When the connection between the contact surface(s) (e.g., the first contact surface 5531 and/or the second contact surface 5541) and the terminal(s) of the charging interface is an invalid connection, the magnetic polarity of the outer end of each ring section 5511 may be opposite to that of the outer end of a corresponding magnetic adsorption structure of the charging interface. The contact surface(s) (e.g., the first contact surface 5531 and/or the second contact surface 5541) cannot be adsorbed with the terminal(s) of the charging interface because the magnetic polarity of the outer end of each ring section 5511 may be the same as that of the outer end of a corresponding magnetic adsorption structure of the charging interface, which may avoid a wrong connection that makes the magnetic connector 55 unable to perform normal work, thereby improving the accuracy and efficiency of coupling, and providing convenience to users.

In some embodiments, the magnetic adsorption ring 551 may be divided into two ring sections 5511 in the circumferential direction.

Specifically, the outer end surface of the magnetic adsorption ring 551 may have a regular symmetrical shape of a circular ring, an elliptical ring, a rectangular ring, etc., as described in the above embodiments, such that the magnetic adsorption ring 551 may be divided into two ring sections 5511 along a symmetry axis of the regular ring. Or the magnetic adsorption ring 551 may be an irregular ring, which may be correspondingly divided into two asymmetric ring sections 5511. The specific division may be determined according to needs, which is not specifically limited here.

In some embodiments, the first contact surface 5531 and the second contact surface 5541 as shown in FIG. 12 may be arranged side by side and corresponding to a positive terminal and a negative terminal of the charging interface, respectively. A dimension of the magnetic adsorption ring 551 in a first direction passing through the symmetry point may be different from a dimension of the magnetic adsorption ring 551 in a second direction perpendicular to the first direction passing through the symmetry point. Specifically, the dimension of the magnetic adsorption ring 551 in the first direction may be greater than that in the second direction, and the outer end of the magnetic adsorption ring 551 may have a shape of an elliptical ring. Further, the magnetic adsorption ring 551 may be divided into two ring sections 5511 arranged side by side along a symmetry axis of the elliptical ring in the first direction or the second direction. The magnetic polarity of the outer end face of one ring section 5511 may be N pole, and the magnetic polarity of the outer end face of the other ring section 5511 may be S pole. Further, the first contact surface 5531 and the second contact surface 5541 of the magnetic connector 55 may also be arranged side by side. In some embodiments, the first contact surface 5531 and the second contact surface 5541 may be arranged in a 180 degrees rotationally symmetrical shape with respect to the symmetry point.

A shape and a count of the magnetic adsorption structure(s) of the charging interface may be the same as that of the magnetic adsorption ring 551 of the magnetic connector 55. The magnetic polarity of the outer end of a magnetic adsorption structure of the charging interface may be opposite to that of the outer end of a corresponding ring section 5511 of the magnetic adsorption ring 551.

If a connection between the contact surface(s) (e.g., the first contact surface 5531 and/or the second contact surface 5541) and the terminal(s) of the charging interface is a valid connection, a ring section 5511 of the magnetic adsorption ring 551 may be adsorbed with a corresponding magnetic adsorption structure of the charging interface to establish an electrical connection. If a connection between the contact surface(s) (e.g., the first contact surface 5531 and/or the second contact surface 5541) and the terminal(s) of the charging interface is an invalid connection, a ring section 5511 with the magnetic polarity of N pole may correspond to a magnetic adsorption structure with the magnetic polarity of N pole, a ring section 5511 with the magnetic polarity of S pole may correspond to a magnetic adsorption structure with the magnetic polarity of S pole, the ring section 5511 and the corresponding magnetic adsorption structure cannot be adsorbed with a corresponding magnetic adsorption structure of the charging interface. This may avoid an invalid connection between the magnetic connector 55 and the charging interface and is convenient for users.

The present disclosure also provides a magnetic connector 55 including the specific structure of the magnetic connector 55 in the loudspeaker apparatus described above. The magnetic connector 55 may be used in a charging interface of an electronic device including the loudspeaker apparatus of the present disclosure, or a power supply interface of a charger, which may be used to absorb a charging interface to position and to establish an electrical connection so as to charge the electronic device. Related structures of the magnetic connector 55 and the technical effects that may be generated may refer to the above embodiment, and will not be repeated here.

The present disclosure may also provide a magnetic connector component, which includes two magnetic connectors 55 as described in the present disclosure. A shape and a count of the ring section(s) 5511 of the magnetic adsorption ring 551 of one magnetic connector 55 may be the same as that of the other magnetic connector 55. A magnetic polarity of the ring section(s) 5511 of the magnetic adsorption ring 551 of the one magnetic connector 55 may be opposite to that of the other magnetic connector 55. When the two magnetic connectors absorb each other, a first contact surface 5531 and a second contact surface 5541 of the one magnetic connector 55 may contact with a first contact surface 5531 and a second contact surface 5541 of the other magnetic connector 55. Other related details may refer to the above embodiments, which will not be repeated here.

The magnetic polarity of the outer end surface of each ring section 5511 of the two magnetic connectors 55 may be set such that when a first contact surface 5531 and a second contact surface 5541 of the one magnetic connector 55 contacts with a first contact surface 5531 and a second contact surface 5541 of the other magnetic connector 55, the two magnetic connectors 55 may be adsorbed together to establish a valid connection if outer ends of their ring sections have opposite magnetic polarities. When the first contact surface 5531 and the second contact surface 5541 of the one magnetic connector 55 contacts with the first contact surface 5531 and the second contact surface 5541 of the other magnetic connector 55, the one magnetic connector 55 and the other magnetic connector 55 cannot be adsorbed together if the outer ends of their ring sections have the same magnetic polarity. This may avoid an invalid connection between the two magnetic connectors 55, thereby improving the accuracy and efficiency of coupling.

Further, in the embodiments of the loudspeaker apparatus in the present disclosure, the magnetic connector 55 may be mounted in a circuit housing 10, for example, a circuit housing 10 for accommodating the control circuit 51.

The circuit housing 10 may include two main side walls 11 spaced apart from each other. An inner surface of at least one main side wall 11 may include two blocking walls 19 spaced apart from each other. The two blocking walls 19 may be arranged in parallel with an end wall 13 of the circuit housing 10. The two main side walls 11 and the two blocking walls 19 may form an accommodating space near a secondary side wall 12, and the magnetic connector 55 may be located in the accommodating space.

In some embodiments, each of the two main side walls 11 may further include a mounting hole 113. The loudspeaker apparatus may further include two fixing components 56. The two fixing components 56 may be inserted into the mounting holes 113 of the two main side walls 11, respectively, and fix the magnetic connector 55.

The count of the mounting holes 113 and the count of the fixing components 56 may be the same. Merely by way of example, a fixing component 56 may be a screw. An end of the screw may pass through a mounting hole 113 of a main side wall 11 to abut against the outer side wall of the magnetic connector 55, and the other end of the screw may be fixed in the mounting hole 113.

In some embodiments, each of the two main side walls 11 may include a mounting hole 113. The magnetic connector 55 may have a 180 degrees rotationally symmetrical structure with respect to a symmetry axis parallel to a direction the magnetic connector 55 along which it is inserted into the accommodating space surrounded by the two main side walls 11 and the two blocking walls 19. Each of the opposite sides of the magnetic connector 55 may include two mounting holes 55512 for receiving the fixing components 56. After the magnetic connector 55 is rotated symmetrically and inserted into the accommodating space, at least one of the two mounting holes 55512 of each of the opposite sides of the magnetic connector 55 may be aligned with a mounting hole 113.

Specifically, the mounting hole 55512 may be configured to receive an inner end of the fixing component 56. The two ends of the fixing component 56 may run through the mounting hole 113 and the mounting hole 55512, respectively, to fix the magnetic connector 55 in the accommodating space.

In some embodiments, the magnetic connector 55 may have 180 degrees rotationally symmetrical shape. In this way, there are two mounting holes matching the mounting holes 113 no matter whether the magnetic connector 55 is rotated or not, so as to fix magnetic connector 55 at the two positions, which may facilitate the mounting of the magnetic connector 55.

Further, the first protective housing 21 or the second protective housing 31 may cover the mounting hole 113 on the main side wall(s) 11. And the corresponding first protective housing 21 and/or the second protective housing 31 may include an exposing hole 57 for the magnetic connector 55 to be exposed, which may facilitate the use of the loudspeaker apparatus.

It should be noted that the above description of the magnetic connector of the loudspeaker apparatus is only a specific example, and should not be regarded as the only feasible implementation solution. Obviously, for those skilled in the art, after understanding the basic principle of the magnetic connector of the loudspeaker apparatus, it is possible to make various modifications and alterations in the form and details of the specific method and step of the magnetic connector of the loudspeaker apparatus without departing from this principle, but these modifications and alterations are still within the scope described above. For example, center axes of the two fixing components 56 may be parallel to each other and arranged side by side. Therefore, the center axes of the two fixing components 56 may not overlap, such that the magnetic connector 55 may be fixed more stably in the circuit housing 10. All such variations are within the protection scope of the present disclosure.

Figure 14:
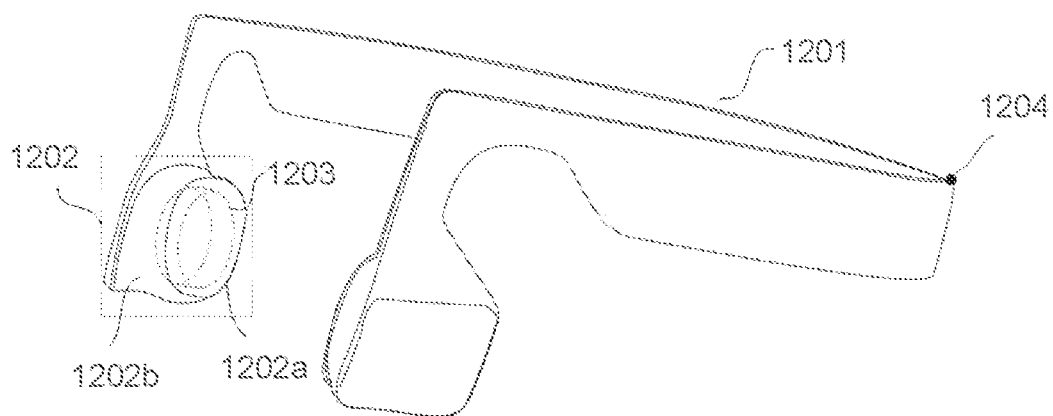
FIG. 14 is a schematic diagram illustrating a simplified structure of a loudspeaker apparatus according to some embodiments of the present disclosure.

FIG. 14 is a schematic diagram illustrating a simplified structure of a loudspeaker apparatus according to some embodiments of the present disclosure. As shown in FIG. 14, in some embodiments, the loudspeaker apparatus may include a headphone holder/headphone strap 1201, a vibration unit 1202, and a transducing apparatus 1203. The vibration unit 1202 may include a contact surface 1202*a* and a housing 1202*b*. The transducing apparatus 1203 may be placed inside and connected to the vibration unit 1202. The vibration unit 1202 may contact a user through the contact surface 1202*a*. For example, the contact surface 1202*a* may fit anywhere on the user's head, such as the top of the head, forehead, cheeks, horns, auricles, back of auricles, etc.

It should be noted that the transducing apparatus 1203 be configured to implement same functions as or similar functions to the earphone core in the above embodiments. The earphone holder/earphone strap 1201 may be configured to fix the loudspeaker apparatus to a human head, which may include the ear hook 20, the rear hook 30, and the circuit housing 10 in the above embodiments. The loudspeaker component 40 in the above embodiments may include the vibration unit 1202, which may refer to a sound generating structure of the loudspeaker apparatus.

During use, the headset stand/headband 1201 may fix the loudspeaker apparatus to a specific part of the user (e.g., a head), and provide a clamping force between the vibration unit 1202 and the user. The contact surface 1202*a* may be connected to the transducing apparatus 1203 and keep contact with the user, and transmit sound to the user through vibration. In some embodiments, the loudspeaker apparatus may have a symmetrical structure. The transducing apparatus on both sides may provide equal and opposite driving forces in a working process. In such cases, a center point of the earphone holder/earphone strap 1201 may be regarded as an equivalent fixed end (e.g., a position shown in 1204) when the loudspeaker apparatus works. In some embodiments, the loudspeaker apparatus may provide stereo sound, that is, driving forces provided by the two transducing apparatuses may have different sizes, or the loudspeaker apparatus may be asymmetry in structure. Then another point or region of the earphone rack/earphone strap 1201 or outside the earphone rack/earphone strap 1201 may be regarded as an equivalent fixed end. A fixed end may be regarded as an equivalent end at a relatively fixed position when the loudspeaker apparatus generates vibrations. In some embodiments, a sound transmission efficiency of the loudspeaker apparatus may be changed and a frequency response of the system in a specific frequency range may be affected by changing one or more physical quantities, such as the clamping force provided by the headset holder/headband 1201 and the quality of the headset holder/headband 1201. For example, a headset holder/headband 1201 including a high-strength material may provide a clamping force different from a headset holder/headband 1201 including a low-strength material. Additionally or alternatively, the clamping force may be changed by changing a structure of the earphone holder/earphone strap 1201 and/or adding an auxiliary apparatus that can provide an elastic force to the earphone holder/earphone strap 1201, thereby affecting the sound transmission efficiency. The change in the size of the earphone holder/headband 1201 when worn may also affect the clamping force. The clamping force may increase with a distance between the vibration units 1202 at both ends of the earphone holder/headphone holder 1201.

Further, in order to obtain an earphone holder/earphone strap 1201 that meets a specific clamping force condition, those skilled in the art may choose materials with different rigidity and/or different modulus to make the earphone holder/earphone strap 1201, or adjust a size of the earphone holder/earphone strap 1201 according to the actual situation. It should be noted that the clamping force of the headphone holder/headband 1201 may not only affect the efficiency of sound transmission, but also affect a sound experience of the user in a bass frequency range. The clamping force mentioned here may be a pressure between a contact surface and the user. Preferably, the clamping force may be between 0.1N-5N. More preferably, the clamping force may be between 0.1N-4N, and even more preferably, the clamping force may be between 0.2N-3N. Still preferably, the clamping force may be between 0.2N-1.5N, and even more preferably, the clamping force may be between 0.3N-1.5N.

Figure 15:
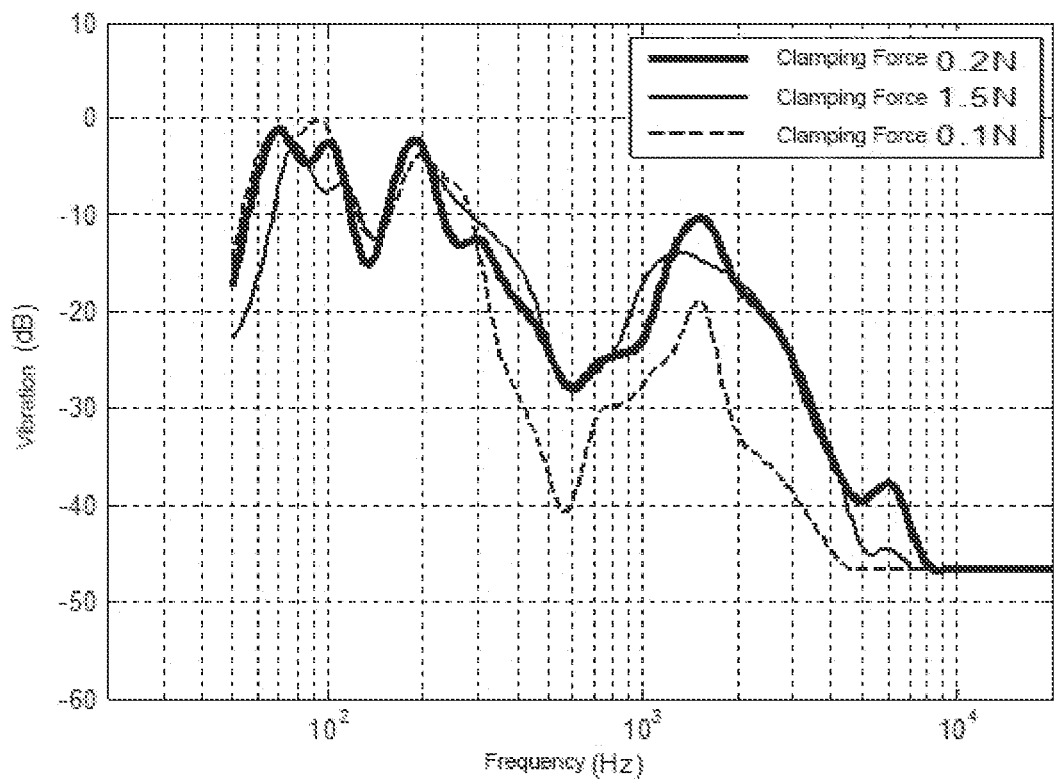
FIG. 15 is a graph illustrating an exemplary vibration response of a loudspeaker apparatus according to some embodiments of the present disclosure.
Figure 16:
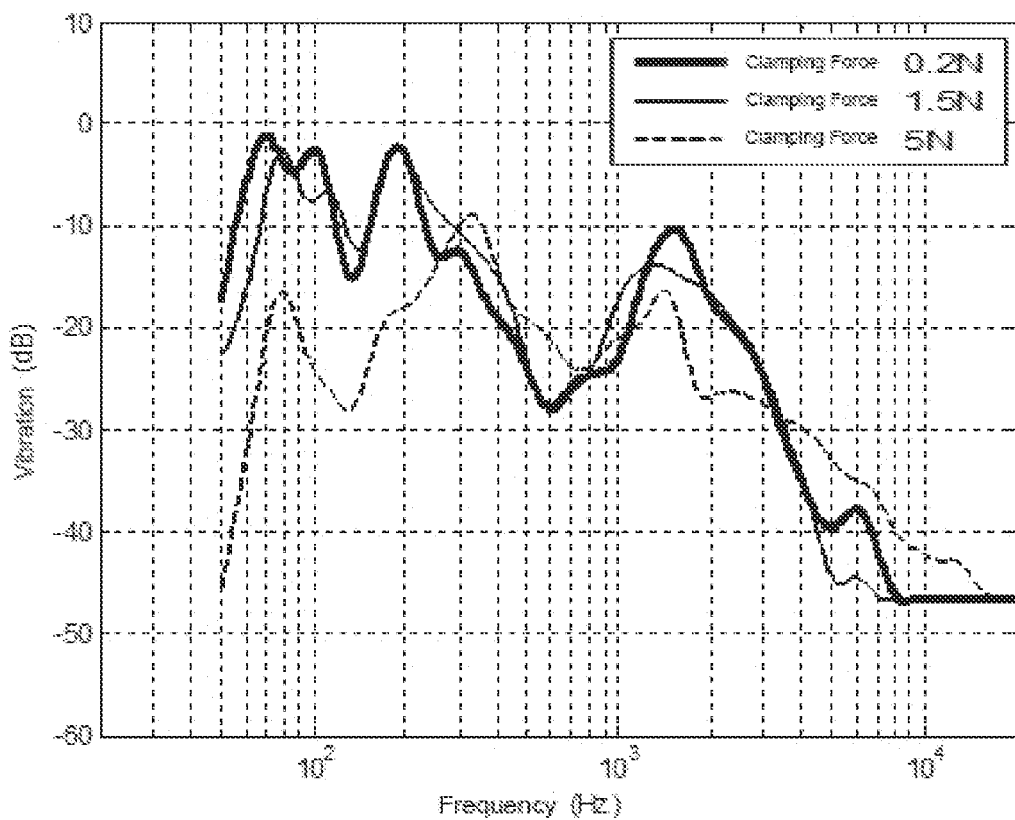
FIG. 16 is a graph illustrating another exemplary vibration response of a loudspeaker apparatus according to some embodiments of the present disclosure.

FIG. 15 is a graph illustrating an exemplary vibration response of a loudspeaker apparatus according to some embodiments of the present disclosure. FIG. 16 is a graph illustrating another exemplary vibration response of a loudspeaker apparatus according to some embodiments of the present disclosure. As shown in FIG. 15 and FIG. 16, in a transmission process of vibrations, a clamping force below a certain threshold may not be conducive to a transmission of high-frequency vibrations. As shown in FIG. 15, for a same vibration source (sound source), when the clamping force is 0.1N, the vibrations (sound) received by a wearer in an intermediate frequency and a high frequency in may be significantly less than the vibrations (sound) received in the intermediate frequency and the high frequency when the clamping force is 0.2N or 1.5N. That is, in terms of sound quality, when the clamping force is 0.1N, the sound performance in the intermediate frequency and the high frequency may be weaker than that in the intermediate frequency and the high frequency when the clamping force is 0.2N-1.5N. Similarly, in the transmission process of vibrations, a clamping force greater than a certain threshold may be not conducive to the transmission of low-frequency vibrations. As shown in FIG. 16, for a same vibration source (sound source), when the clamping force is 5.0N, vibrations (sound) received by the wearer in an intermediate frequency and a low frequency may be significantly less than the vibrations (sound) received in the intermediate frequency and the low frequency when the clamping force is 0.2N or 1.5N. That is, in terms of sound quality, when the clamping force is 5.0N, the sound performance in the low frequency may be weaker than that in the low frequency when the clamping force is 0.2N-1.5N.

In some embodiments, the pressure between the contact surface and the user may be kept in an appropriate range by selecting an appropriate earphone holder/earphone strap 1201. The pressure between the contact surface and the user should be greater than a certain threshold. Preferably, the threshold may be 0.1N. More preferably, the threshold may be 0.2N. More preferably, the threshold may be 0.3N, and even more preferably, the threshold may be 0.5N. The pressure between the contact surface and the user should be less than another threshold. Preferably, the threshold may be 5.0N. More preferably, the threshold may be 4N. Further preferably, the threshold may be 3N, and even more preferably, the threshold may be 1.5 N.

In some embodiments, the loudspeaker apparatus described above may transmit sound to the user by means of air conduction. When transmitting sound by means of air conduction, the loudspeaker apparatus may include one or more sound sources. The sound sources may be located at a specific position of the user's head, such as the top of the head, forehead, cheeks, horns, auricle, back of auricle, etc., without blocking or covering ear canals. For illustration purposes, FIG. 17 is a schematic diagram illustrating sound transmitting through air conduction according to some embodiments of the present disclosure.

Figure 17:
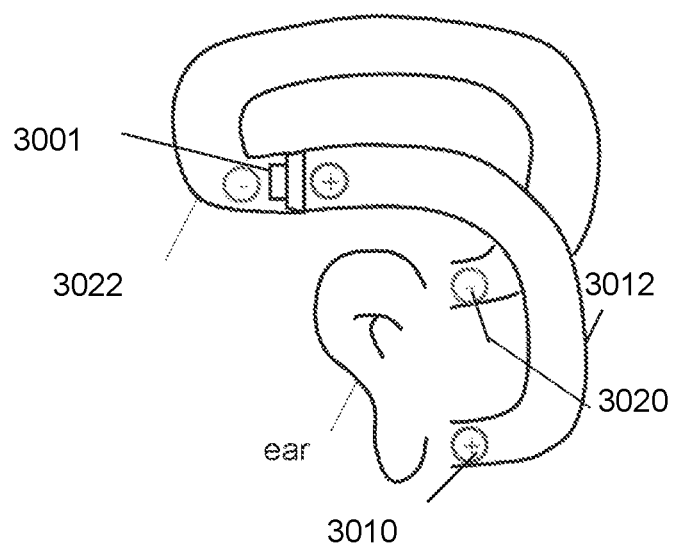
FIG. 17 is a schematic diagram illustrating sound transmitting through air conduction according to some embodiments of the present disclosure.

As shown in FIG. 17, a sound source 3010 and a sound source 3020 may generate sound waves with opposite phases ("+" and "−" in the figure indicate opposite phases). For simplicity, a sound source used herein may refer to a sound output hole on the loudspeaker apparatus. For example, the sound source 3010 and the sound source 3020 may be two sound output holes located at specific positions (e.g., the earphone core housing 41, or the circuit housing 10) on the loudspeaker apparatus.

In some embodiments, the sound source 3010 and the sound source 3020 may be generated by a same vibration apparatus 3001. The vibration apparatus 3001 may include a vibration diaphragm (not shown in figures). When the vibration diaphragm is driven by an electric signal to vibrate, a front side of the vibration diaphragm may drive air to vibrate, and the sound source 3010 may be formed at the sound output hole through a sound guiding channel 3012. A back side of the vibration diaphragm may drive air to vibrate, and the sound source 3020 may be formed at a sound output hole through a sound guiding channel 3022. A sound guiding channel may refer to a sound propagation route from the vibration diaphragm to a corresponding sound output hole. In some embodiments, a sound guiding channel may be a route surrounded by a specific structure (e.g., the earphone core housing 41, or the circuit housing 10) on the loudspeaker. It should be noted that, in some embodiments, the sound source 3010 and the sound source 3020 may also be generated by different vibration apparatuses through vibrations of different vibration diaphragms, respectively.

In some embodiments, part of the sound generated by the sound source 3010 and the sound source 3020 may be transmitted to the user's ear and form a sound heard by the user, and the other part may be transmitted to the environment and form a sound leakage. Considering that the sound source 3010 and the sound source 3020 are relatively close to the user's ear, for convenience of description, the sound transmitted to the user's ear may be called near-field sound, and leaked sound transmitted to the environment may be called far-field sound. In some embodiments, the frequencies of the near-field sound and the far-field sound generated by the loudspeaker apparatus may be related to a distance between the sound source 3010 and the sound source 3020. Generally, the near-field sound and the far-field sound (leakage) generated by the loudspeaker apparatus may increase with the distance between the two sound sources.

In some embodiments, the distance between the sound source 3010 and the sound source 3020 may be designed separately, such that a low-frequency near-field sound (e.g., sound with a frequency less than 800 Hz) generated by the loudspeaker apparatus may be as large as possible, and a high-frequency far-field sound (e.g., a sound with a frequency greater than 2000 Hz) may be as small as possible. In order to achieve the above purpose, the loudspeaker apparatus may include two or more groups of two-point sound sources. Each group of two-point sound sources may include two sound sources similar to the sound source 3010 and the sound source 3020, which may generate sounds with specific frequencies, respectively. Specifically, a first group of two-point sound sources may be configured to generate low-frequency sounds, and a second group of two-point sound sources may be configured to generate high-frequency sounds. In order to obtain a large low-frequency near-field sound, a distance between the two sound sources in the first group of two-point sound sources may be set to be a large value. And since the low-frequency signal has a long wavelength, a large distance between the two sound sources in the first group may not cause an excessive phase difference in the far field, and may not cause too much sound leakage in the far field. In order to obtain a small high-frequency far-field sound, the distance between two sound sources in the second group of two-point sound sources may be set to be a small value. Since the high-frequency signal has a short wavelength, a small distance between the two sound sources may avoid a formation of a large phase difference in the far field, and may avoid a formation of large sound leakage. The distance between the two sound sources in the second group may be less than in the first group.

The above descriptions of the loudspeaker apparatus are only a specific example and should not be considered as the only feasible implementation. Obviously, for those skilled in the art, after understanding the basic principle of the loudspeaker apparatus, it is possible to make various modifications and changes in the structure and/or related methods of the loudspeaker apparatus without departing from this principle, but these modifications and changes are still within the scope described above. For example, the earphone holder/earphone strap 1201 may include at least one type of memory alloy. The user may change the shape of the earphone holder/earphone strap 1201 as needed such that the earphone holder/earphone strap 1201 may fit a contour of the head. All such variations are within the protection scope of the present disclosure.

The beneficial effects of the present disclosure embodiment include, but are not limited to: (1) the circuit housing, the first protective housing, and the second protective housing may be molded separately so as to protect a control circuit or a battery from damages caused by a high temperature; (2) the first protective housing and the second protective housing may not completely cover the entire circuit housing, and components for user interaction may be exposed, which may be convenient for users to use; (3) there is no need to set a separate space for flexible circuit board(s), which may further improve space utilization; (4) the first contact surface and the second contact surface may be accurately positioned by aligning the magnetic adsorption ring to realize the matching connection with the corresponding charging interface, thereby improving the accuracy of the coupling with the corresponding charging interface; (5) the loudspeaker apparatus may have good elasticity, which may maximize the wearing comfort. It should be noted that different embodiments may have different beneficial effects. In different embodiments, the possible beneficial effects may be any one or a combination of the above, and may also be any other possible beneficial effects.

The basic concepts have been described above. Obviously, to those skilled in the art, the disclosure of the invention is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

We claim:

1. A loudspeaker apparatus, comprising:
   a circuit housing configured to accommodate a control circuit or a battery component;
   an ear hook connected to one end of the circuit housing and at least partially covered by a first protective housing;
   a rear hook connected to another end of the circuit housing and at least partially covered by a second protective housing, wherein the first protective housing and the second protective housing at least partially cover a periphery of the circuit housing from both ends of the circuit housing in a sleeve manner, respectively, and a cover area of one of the first protective housing and the second protective housing on the circuit housing is greater than half of a cover area of the other one of the first protective housing and the second protective housing on the circuit housing;
   a loudspeaker component connected to one end of the ear hook, the loudspeaker component including an earphone core and an earphone core housing for accommodating the earphone core; and
   a magnetic connector disposed on the circuit housing, wherein the magnetic connector is configured to charge the loudspeaker apparatus.

2. The loudspeaker apparatus of claim 1, wherein the circuit housing includes a main side wall, an auxiliary side wall, and an end wall connected to each other, wherein the first protective housing and the second protective housing are coupled with each other on the main side wall and the auxiliary side wall.

3. The loudspeaker apparatus of claim 2, wherein an inner surface of the first protective housing or the second protective housing corresponding to the main side wall is provided with a positioning convex, the positioning convex has a stripe shape and is arranged obliquely with respect to the auxiliary side wall, and an outer surface of the main side wall is provided with a positioning concave matching the positioning convex.

4. The loudspeaker apparatus of claim 2, wherein a coupled region between the first protective housing and the second protective housing on the main side wall and the auxiliary side wall is arranged obliquely with respect to the auxiliary side wall.

5. The loudspeaker apparatus of claim 2, wherein
   the rear hook further comprises a plug end facing the circuit housing, the second protective housing is placed outside at least a portion the plug end;
   the circuit housing includes a jack facing the rear hook, at least a portion of the plug end is inserted into the jack; wherein the plug end includes a slot that is perpendicular to an insertion direction of the plug end relative to the jack, and a first through hole corresponding to the slot position is disposed on a first side wall of the jack; and the loudspeaker apparatus further comprises a fixing component, wherein the fixing component includes two pins disposed in parallel and a connecting part for connecting the pins; and the pins are inserted into the slot from outside of the plug end through the first through hole, so as to achieve a plug connection between the plug end and the jack.

6. The loudspeaker apparatus of claim 5, wherein the jack further includes a second through hole opposite to the first through hole, the second through hole being disposed on a second side wall of the jack opposite to the first side wall of the jack, the pins being inserted into the second through hole through the slot.

7. The loudspeaker apparatus of claim 5, wherein
the plug end comprises a first plug section and a second plug section;
a cross-section area of the first plug section is larger than that of the second plug section in a cross-sectional direction perpendicular to an insertion direction of the plug end;
the slot is disposed on the second plug section, and
the second plug section is inserted into the jack.

8. The loudspeaker apparatus of claim 7, wherein the first plug section includes a first wiring duct extending along an insertion direction of the jack;
the second plug section includes a second wiring duct running through the second plug section;
an inner side wall of the jack includes a third wiring duct with one end connected to the first wiring duct and the other end connected to the second wiring duct; and
the loudspeaker apparatus further comprises a wire connected to the control circuit or the battery component after passing through the rear hook, the first wiring duct, the third wiring duct, and the second wiring duct in sequence.

9. The loudspeaker apparatus of claim 1, wherein the magnetic connector comprises:
a magnetic adsorption ring;
an insulation base including at least two accommodating holes, at least part of the insulation base being inserted into the magnetic adsorption ring; and
a first terminal and a second terminal, each of which having a shape of a cylinder and being inserted into a corresponding accommodation hole, wherein an outer end of the first terminal and an outer end of the second terminal are visible seen from a direction facing a top surface of the insulation base so as to form a first contact surface and a second contact surface.

10. The loudspeaker apparatus of claim 9, wherein
the insulation base includes a supporting member and an insertion member,
a cross-section area of the supporting member is larger than that of the insertion member so as to form a supporting table at a connection between the two portions,
the insertion member is inserted into the magnetic adsorption ring, and
the magnetic adsorption ring is further supported by the supporting table.

11. The loudspeaker apparatus of claim 10, wherein the magnetic connector further includes a housing, and the housing includes a body and a flange located at an outer end of the body and protruding into the body, wherein the body is sleeved on the periphery of the insulation base and the magnetic adsorption ring, and the flange further covers an outer end of the magnetic adsorption ring.

12. The loudspeaker apparatus of claim 9, wherein
the magnetic adsorption ring has a shape of a circular ring with a preset symmetry point as a center,
each of the first contact surface and the second contact surface has a shape of a circular or a circular ring concentrically arranged with the magnetic adsorption ring.

13. The loudspeaker apparatus of claim 9, wherein the magnetic adsorption ring has a 180 degrees rotationally symmetrical shape with respect to a preset symmetry point, and a dimension of the magnetic adsorption ring in a first direction passing through the symmetry point is different from a dimension of the magnetic adsorption ring in a second direction perpendicular to the first direction passing through the symmetry point.

14. The loudspeaker apparatus of claim 9, wherein
the magnetic adsorption ring is divided into at least two ring sections in a circumferential direction, and
outer ends of adjacent ring sections have different magnetic polarities.

15. The loudspeaker apparatus of claim 1, wherein the battery assembly comprises:
a battery including a positive terminal and a negative terminal; and
a flexible circuit board including a first board and a second board vertically connected to the first board, the first board being fixed on the battery, the second board including a plurality of bonding pads, wherein
the plurality of bonding pads include two first bonding pads and a plurality of second bonding pads,
one of the two first bonding pads is electrically connected to the positive terminal of the battery via a first flexible lead disposed on the first board, the other one of the two first bonding pads is electrically connected to the negative terminal of the battery via a first flexible lead disposed on the second board,
the plurality of second bonding pads are divided into at least two groups, the second bonding pads in each group being electrically connected to each other by a second flexible lead disposed on the first board; and
the flexible circuit board is electrically connected to an audio signal wire and an auxiliary signal wire of the earphone core housing.

16. The loudspeaker apparatus of claim 15, wherein
the battery includes a battery core, the battery core including a body region and a sealing region,
a thickness of the body region is greater than that of the sealing region such that a side surface of the sealing region and a side surface of the body region form a step, and
the second board is attached to the side surface of the sealing region.

17. The loudspeaker apparatus of claim 16, wherein the battery further includes a hard circuit board disposed on the side surface of the sealing region,
the positive terminal and the negative terminal are disposed on the hard circuit board,
the first board is fixed on the hard circuit board, and
the hard circuit board further includes a protective circuit.

18. The loudspeaker apparatus of claim 15, wherein the second bonding pads in each group are spaced apart by interval arranged along a width direction of the second board, and are staggered from each other along a length direction of the second board.

19. The loudspeaker apparatus of claim 1, wherein
the loudspeaker component at least includes a contact surface that is in direct or indirect contact with a user, and a pressure between the contact surface and the user is larger than 0.1N and less than 5N.

* * * * *